(12) United States Patent
Bodorik et al.

(10) Patent No.: US 11,868,998 B2
(45) Date of Patent: *Jan. 9, 2024

(54) SYSTEM AND METHOD FOR TRACKING OF PROVENANCE AND FLOWS OF GOODS, SERVICES, AND PAYMENTS IN RESPONSIBLE SUPPLY CHAINS

(71) Applicant: Peer Ledger Inc., Halifax (CA)

(72) Inventors: Peter Bodorik, Halifax (CA); Dawn Jutla, Halifax (CA)

(73) Assignee: PEER LEDGER INC., Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,345

(22) Filed: Aug. 2, 2022

(65) Prior Publication Data
US 2022/0374887 A1 Nov. 24, 2022

Related U.S. Application Data

(63) Continuation of application No. 16/640,822, filed as application No. PCT/CA2018/051008 on Aug. 22, 2018, now Pat. No. 11,461,775.
(Continued)

(51) Int. Cl.
*G06Q 20/38* (2012.01)
*G06F 9/54* (2006.01)
(Continued)

(52) U.S. Cl.
CPC ........... *G06Q 20/3829* (2013.01); *G06F 9/54* (2013.01); *G06Q 10/083* (2013.01);
(Continued)

(58) Field of Classification Search
CPC ............. G06Q 20/3829; G06Q 10/083; G06Q 10/087; G06Q 10/08; G06Q 10/00; G06F 9/54; H04L 9/0637; H04L 9/50
(Continued)

(56) References Cited

U.S. PATENT DOCUMENTS

| 2011/0016318 A1* | 1/2011 | Syngkon ............... H04L 9/3247 340/572.1 |
| 2017/0005804 A1* | 1/2017 | Zinder ................ G06F 21/6254 |

(Continued)

FOREIGN PATENT DOCUMENTS

CN 106096795 A 11/2016

OTHER PUBLICATIONS

International Search Report issued in connection with PCT Patent Application No. PCT/DE2020/000138 dated Oct. 6, 2020.

*Primary Examiner* — Garcia Ade
(74) *Attorney, Agent, or Firm* — TAROLLI, SUNDHEIM, COVELL & TUMMINO L.L.P.

(57) ABSTRACT

A system and method for tracking the provenance of an item, service, and/or payment is provided. The system includes a transaction processing system for generating and recording a provenance transaction that includes information to track the provenance of an item, service, transformation, and/or payment; a blockchain interface for facilitating communication with a blockchain, the blockchain interface configured to store the provenance transaction on the blockchain and to retrieve the provenance transaction from the blockchain; and a search and provenance graph system for generating a directed graph to represent the provenance of an item, service, and/or payment using the provenance transaction stored on the blockchain.

20 Claims, 21 Drawing Sheets

Related U.S. Application Data

(60) Provisional application No. 62/548,624, filed on Aug. 22, 2017.

(51) Int. Cl.
    *G06Q 10/083*    (2023.01)
    *G06Q 10/087*    (2023.01)
    *H04L 9/06*        (2006.01)
    *H04L 9/00*        (2022.01)

(52) U.S. Cl.
    CPC ......... *G06Q 10/087* (2013.01); *H04L 9/0637* (2013.01); *H04L 9/50* (2022.05)

(58) Field of Classification Search
    USPC .......................................................... 705/71
    See application file for complete search history.

(56) References Cited

U.S. PATENT DOCUMENTS

2017/0031874 A1     2/2017   Boudville
2018/0337770 A1*  11/2018  Bathen .................. H04L 9/3239

\* cited by examiner

| | |
|---|---|
| Trxn-ID: | 101 |
| Trxn-type: | Register-item |
| PFTS-item-ID: | 301 |
| Company-item-ID: | 601 |
| Item-name: | Scrap Gold |
| Owner-company-ID: | 501 |
| Supplier-ID: | 701 |
| Qty: | 2 |
| Weight-per-item: | 1 kg |

| | |
|---|---|
| Trxn-ID: | 102 |
| Trxn-type: | Register-item |
| PFTS-item-ID: | 302 |
| Owner-company-ID: | 701 |
| Company-item-ID: | 602 |
| Item-name: | Gold nuggets |
| Supplier-ID: | 702 |
| Qty: | 1 box |
| Weight: | 1 kg |

| | |
|---|---|
| Trxn-ID: | 105 |
| Trxn-type: | Transform |
| Transform-type: | 2-to-1 |
| Owner-company-ID: | 501 |
| To-item-1-PFTS-ID: | 305 |
| To-company-item-id: | 605 |
| Item-name: | Gold bar |
| Qty: | 3 |
| From-item-1-PFTS-ID: | 301 |
| From-item-1-qty: | 1 |
| From-item-2: | 302 |
| From-item-2-weight: | 3 kg |

| | |
|---|---|
| Trxn-ID: | 112 |
| Trxn-type: | Transform |
| Transform-type: | 1-to-2 |
| Owner-company-ID: | 502 |
| To-1-PFTS-item-ID: | 315 |
| To-1-company-item-ID: | 615 |
| To-1-Item-name: | Gold bar 0.5 kg |
| To-1-Qty: | 2 |
| 1-Weight-per-item: | 0.5 kg |
| To-2-PFTS-item-ID: | 316 |
| To-2-company-item-ID: | 616 |
| To-2-item-name: | Gold bar 1kg |
| To-2-Qty: | 1 |
| To-2-Weight-per: | 1 kg |
| From-item-1-PFTS-ID: | 306 |
| From-item-1-weight: | 20 tons |

| | |
|---|---|
| Trxn-ID: | 104 |
| Trxn-type: | Register-item |
| PFTS-item-ID: | 306 |
| Owner-company-ID: | 702 |
| Company-item-ID: | 606 |
| Item-name: | Gold Dore |
| Supplier-ID: | 720 |
| Weight: | 120 tons |

| | |
|---|---|
| Trxn-ID: | 120 |
| Trxn-type: | Ship-item |
| PFTS-item-ID: | 316 |
| Owner-company-ID: | 502 |
| Company-item-ID: | 616 |
| Ship-to: | 501 |
| Item-name: | Gold bar |
| Qty: | 1 |
| Weight: | 1 kg |
| Ship-doc-ID: | 901 |
| Line-no: | 4 |
| Receive-item Trxn-ID: | 130 |

| | |
|---|---|
| Trxn-ID: | 130 |
| Trxn-type: | Receive-item |
| PFTS-item-ID: | 330 |
| Owner-company-ID: | 501 |
| Company-item-ID: | 630 |
| Item-name: | Gold bar |
| Qty: | 1 |
| Weight: | 1 Kg. |
| Ship-item-Trx-ID: | 120 |

| | |
|---|---|
| Trxn-ID: | 140 |
| PTS trxn type: | Transform |
| Owner company ID: | 501 |
| To-1-PFTS-item-ID: | 340 |
| To-1-company-item-ID: | 625 |
| To-1-Item-name: | Gold Coin 0.5 kg |
| To-1-Qty: | 2 |
| 1-Weight-per-item: | 0.5 kg |
| To-2-PFTS-item-ID: | 345 |
| To-2-company-item-ID: | 636 |
| To-2-item-name: | Gold Coin 0.1 kg |
| To-2-Qty: | 10 |
| To-2-Weight-per: | 0.1 kg |
| From-item-1-PTS ID: | 330 |
| From-item-1-qty: | 1 |
| From-item-2-PTS ID: | 305 |
| From-item-2-qty: | 2 |

FIG. 7

Copy relevant item info from request 2001 to transaction-in-preparation

Set RCVE-CUSTODY TRANSACTION ID TO NULL (indicates that transaction is unreconciled);
Copy the ID of the Change Custody Document from request 2001 to the transaction (in preparation).

FIG.12A

Copy relevant item info from request 2001 to transaction-in-preparation.

Set RCVE-CUSTODY TRANSACTION ID TO NULL (indicates that transaction is unreconciled);

Copy the ID of the Give-service Document (and line number if appropriate) from request 2001 to the transaction (in preparation).

FIG.13A

SYSTEM AND METHOD FOR TRACKING OF PROVENANCE AND FLOWS OF GOODS, SERVICES, AND PAYMENTS IN RESPONSIBLE SUPPLY CHAINS

RELATED APPLICATIONS

The present invention is a U.S. Divisional Applications, claiming priority to U.S. National Phase application Ser. No. 16/640,822, filed on Feb. 21, 2020, which claims priority to PCT Patent Application No. PCT/CA2018/051008, filed on Aug. 22, 2018, which claims further priority to U.S. Provisional Patent Application No. 62/548,624, filed on Aug. 22, 2017; the entireties of all are hereby incorporated herein by reference.

TECHNICAL FIELD

The technical field is generally logistics data management, and specifically supply train tracking.

BACKGROUND

Traceability systems use physical identifiers, segregation, documentation and/or mass balancing to track items within and across enterprises.

Companies use Enterprise Resource Planning (ERPs) systems to track the flow of materials throughout their system. This includes the reception of material, products, services, and parts, through production, re-packaging and re-selling, to shipment of sold products/services, associated business documents, and payments.

For transparency of provenance to consumers (and many companies), goods, services, and payments are tracked through the parts of a value chain, for example from origin (e.g., materials-producer) to end-users. In addition, in some industries compliance to governments' regulations to prevent money laundering requires tracking the flows of payments for associated goods and services. Currently, track-and-trace systems provide coverage over very few entire value chains.

Complete traceability requires organizations to collaborate in new ways along entire value chains. Difficulties persistin the implementation of the tracking, however. For instance, internal tracking identifiers for products, services, and/or payments must often be correlated to the identifiers of other companies. Not all parties in an industry agree to use the same identifiers or adopt similar data formatting standards. For instance, the formats of tracking/tracing and risks data are often incompatible across systems.

Some companies may force their suppliers to conform to common coding schemes when referring to products in their supply chains. In many situations, however, this is not the case and companies that want to participate in tracking the provenance of a product's origins, and how the product transforms as it moves through a value chain, must collaborate (or co-operate) with other companies to agree to use a traceability system to keep track of the materials, parts and supplies that go into the products they produce, process, (re)package and/or ship to other companies or end-users.

In some of these collaborations, a third-party's tracking software may be used to correlate supplies and parts amongst the companies. That is, the third party may be in possession of information that companies who are participating in the tracking scheme may not want to be disclosed to other companies (such as potential competitors).

For instance, U.S. Pat. No. 9,436,923 B1 discloses digitizing SKUs and generating a set of private/public keys for each SKU. It will be appreciated that the overhead in managing keys for each SKU is difficult. For instance, it is too large for providing information security around identifiers for most consumer goods moving through a value chain within an industry ecosystem, even for high-value goods.

Some systems are also not required to trace change of ownership of items or components but would like only to keep original source information throughout.

Pure blockchain systems inherently provide traceability through the owner of an item cryptographically signing to give up ownership, and a receiver of the item cryptographically signing to accept the item in a classic possess, transfer, accept cycle. The blockchain records these ownership proofs and transfers of ownership immutably. However, the blockchain does not provide the distinction between a change of ownership and a change of custody without a change of ownership. Native blockchain traceability must be augmented with special transactions to handle the tracing of changes of custody without change of ownership.

Pure blockchain models require decentralized business governance which poses control difficulties for many businesses. But blockchain is useful for immutability, accountability and non-repudiation. What is needed is new hybrid traceability system with centralized control components on a decentralized blockchain architecture.

SUMMARY

What is provided is a secure hybrid blockchain-based traceability system and methods to fully track the provenance of materials or components used in a product, service, or payment. This can include tracking product and/or service and/or payment identifiers, support novel tracking/tracing transactions, records of trading activities and associated information on the blockchain for supplier ecosystems and value chains.

To augment blockchain's native traceability, the solution also provides unique transform transactions that record the identifiers of one or more inputs to a transformation process which may be an aggregation or disaggregation of materials, a loss or tolerance factor, and record one or more unique identifiers of the outputs.

ERPs generally do not handle funds transfer or settling bills using cryptographic currency.

The solution is directed at integrating methods of the Provenance and Flow Tracking System (PFTS) with the companies' enterprise or supply chain systems for the purposes of tracking provenance of product, service, and payment flows.

BRIEF DESCRIPTION OF THE DRAWINGS

FIG. 7 (SHEET 7/21) is a table that depicts examples of PFTS transactions.

FIG. 12A (SHEET 13/21) is a diagram depicting an embodiment of the process for the Change-Custody Transaction Generation.

LISTING OF REFERENCE NUMERALS USED IN THE DRAWINGS

Figure 1:
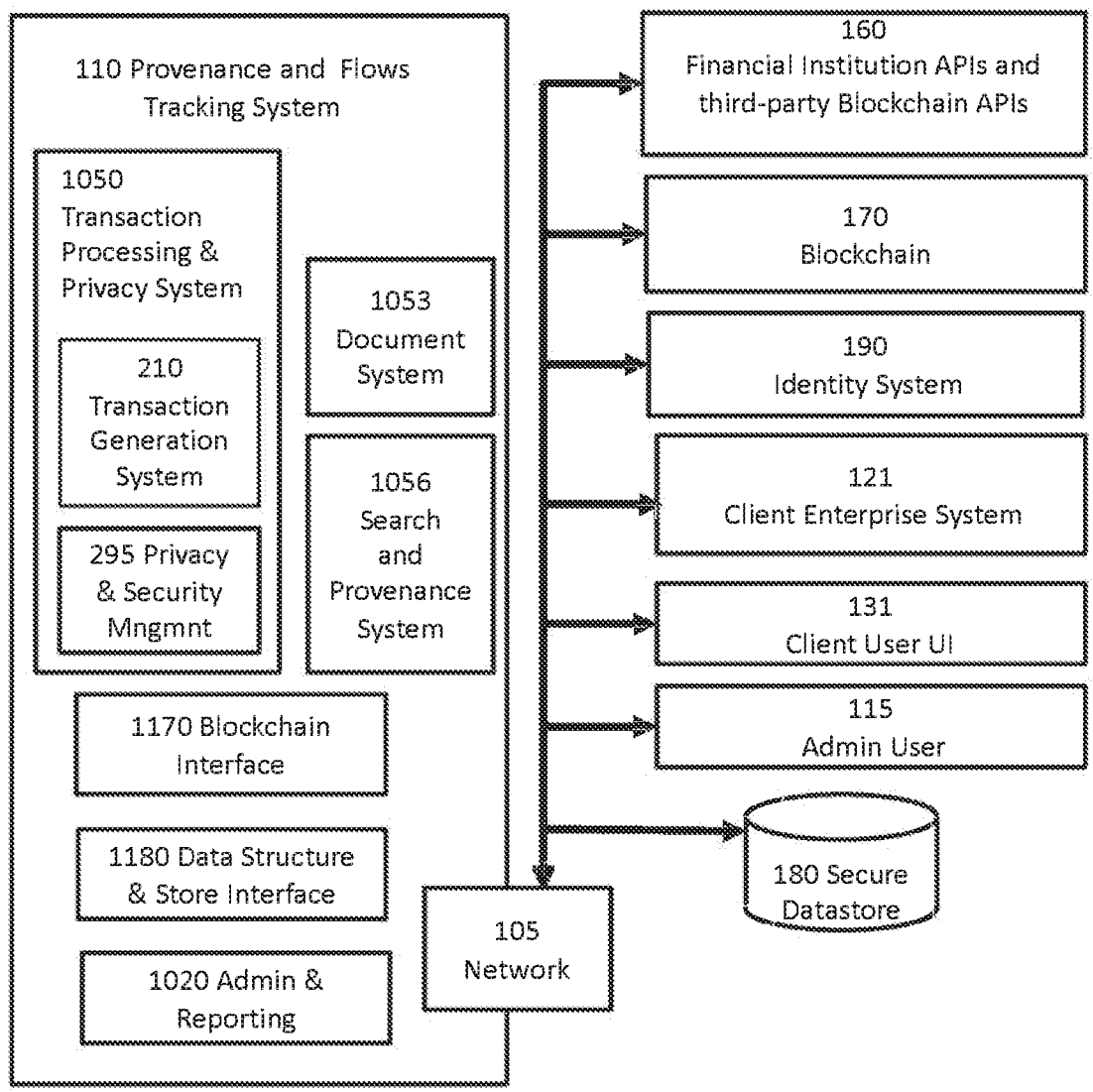
FIG. 1 (SHEET 1/21) depicts a block diagram of an embodiment of the Provenance and Flows Tracking System 110 for goods, services, and/or payments.

100 Platform
105 Network
109 Admin User
110 Provenance and Flows Tracking System (PFTS)
111 Multiple PFTS 1
112 Multiple PFTS 2
113 Multiple PFTS 3
115 Admin User UI
121 Client Enterprise System 1
122 Client Enterprise System 2
123 Client Enterprise System 3
131 Client UI 1
132 Client UI 2
133 Client UI 3
160 Financial Institution APIs and third-party Blockchain APIs
170 Blockchain
180 Secure Data Store
190 Identity System
210 Transaction Generation System
267 Receive Custody Transaction Generation
260 Registration Transaction Generation
265 Change Custody Transaction Generation
270 Ship-Item Transaction Generation
275 Receive-Item Transaction Generation
277 Give-Service Transaction Generation
279 Receive-Service Transaction Generation
280 Transform Transaction Generation
290 Pay Transaction Generation
295 Privacy and Security Management System
297 Request writing of prepared transaction and item records to blockchain(s) and data store(s) including updates to items that served as input to a transform
299 Store ancillary data for efficient data access in data store(s)
900 Grant access to API
910 Payer and Recipient grant access to API
915 Build transactions
1020 Admin and Reporting
1050 Transaction Processing System
1053 Document System
1056 Search and Provenance Graph System
1170 Blockchain Interface
1180 Data Store Interface
1181 Data Store Interface
2001 Request to Client ES API
2002 Request to Transaction Processing System
2005 Message from Transaction Processing System to Identity System
2009 Reply from Identity System to Transaction Processing System
2031 Request to Blockchain Interface
2033 Request from Blockchain Interface to Blockchain
2034 Response from Blockchain Interface
2036 Request to Blockchain
2037 Return message from blockchain
2045 Return Message from Blockchain Interface to Transaction Processing System
2046 Request from Transaction Processing System to Blockchain Interface
2047 Request from Blockchain Interface to Blockchain
2048 Response from Blockchain to Blockchain Interface
2049 Response from Blockchain Interface to Transaction Processing System
2050 Return Message from Transaction Processing to Client ES
2060 Request from Transaction Processing to Data Structure Interface
2065 Request from Data Structure Interface to Data Store
2070 Response from Data Store to Data Structure Interface 2080 Response from Data Structure Interface to Transaction Processing System

DETAILED DESCRIPTION

One or more products, or a supply of some material, or service, or funds, or anything that can be described in various units, is referred to in this application as an item. Thus, although the word item is not a collective noun, it is used to refer not only to a product, such as a widget, but also to supply, such as a ton of ore, or a volume of liquid chemical, or to a service, or funds being transferred, such as a payment. Furthermore, the term "transaction" is used as a synonym for the term "trading activity record". Furthermore, when dealing with physically countable items, such as 20 widgets being shipped, instead of referring to the 20 widgets simply as a shipped item, they are referred to as an item-set. For services and payments, however, the quantity is used is one, such as one payment or service, i.e., payments and service are treated as individually tracked units.

In an embodiment a provenance and flows tracking system (PFTS) 110 is provided. The PFTS 110 integrates with a companies' Enterprise Systems (ES) 121. An ES 121 includes, but is not limited to, a company's supply chain, production, product distribution systems, and its integration with user interfaces to communicate with users. The ES 121 is configured to provide information on the production and flow of goods, services, and/or payments to the PFTS 110. This information is used to provide the provenance and flows of goods, services and payments—that is to state with surety which products and services were used to form other products or services, and to maintain knowledge of flows throughout parts or an entire value chain.

The PFTS 110 can be implemented by one or more computer systems that are connected, via networks, to one or more ES's (121, 122, 123) to manage information on the receiving, production, (re)packaging, transformation, payment, and shipment of goods.

FIG. 1 depicts a block diagram of an embodiment of the PFTS 110. The PFTS 110 can be used for tracking the provenance of items. Items include, but are not limited to, goods, services, and/or payments.

The PFTS 110 includes an Admin & Reporting System 1020, a Transaction Processing System 1050, a Document System 1053, a Blockchain Interface 1170 that facilitates communication with a Blockchain 170, a Data Store Interface 1180 for communication with the Secure Datastore 180, and an Application Programming Interface (API).

The Transaction processing system 1050 facilitates recording of the goods, services, and payment transactions for tracked goods and services. The transaction processing system 1050 includes a Transaction Generation System 210 and Privacy and Security Management System 295.

A PFTS transaction is a record of trading activity and is one of a set of operation(s) on an item (product/service/payment). A PFTS transaction includes, but is not limited to, a registration of goods, supply or services, a shipment, receiving, transfer of custody, transfer of ownership, a transformation of different forms, service, pay, or a combination thereof. These PFTS transaction are eventually stored on the blockchain 170 via the blockchain interface 1170.

The PFTS exchanges data with other network 105 connected services and systems via an API. This can include, but is not limited to the blockchain 170, the identity system 190, financial institutions and third-party APIs or blockchain APIs 160, Admin user user-interface (UI) 115, client Enterprise Systems (ES) 121, client Users 131, and one or more secure data stores 180.

In an embodiment, the API is configured to receive information from the company's ES 121 or from the company's users connected to the PFTSs portal (which includes a User Interface, i.e., the client UI 131). This information can include, but is not limited to, the company's trading activities such as shipments or reception of goods and/or supply, and their associated documents (such as Delivery Invoices or Shipment manifests). This information can also include information to record the use of the received items/supply for production purposes. This information may also include information regarding (re)packaging and transformations.

As an example, a bill of materials document describes items and materials used in a production of an item(s). It is sent by a company to the PFTS 110, via APIs. Once received, the bill of materials document is parsed and information about items and goods/materials used in the production of the item (in this example) is recorded in its data store (in this case, the blockchain).

In this example the PFTS APIs are configured to obtain, from the company and without human intervention, information from work or production orders that describe the items/supply that were used to produce the products. The work order determines which production process is used to transform which goods and supplies into which products and services.

In this example the PFTS 110 then extracts information from the work order. This information can include, but is not limited to, the weights and/or quantities and or volume of goods and supplies that are used as input and transform them, using the identified process, into produced goods and/or supplies and/or services, including their weights and quantities or other measurement units or appropriate properties. In this example any waste, residue, or efficiency factors for the processes are also extracted from the enterprise system and input to the PFTS.

In some instances this information, when received by the PFTS 110, is crosschecked and/or reconciled with other information received from the company or from other companies. That is, the information in some transactions is checked against data from the companies' suppliers and also from their clients. For instance, PFTS checks the shipment information against the matching receiving documents to determine the flow of goods (or services, or payments) across companies. In this example the PFTS 110 creates unique identifiers for each item/supply shipped and for each item/supply received. This information is then recorded in a form of transactions in its data store (which may or may not be on the blockchain) together with any cross-reference information to the actual item numbers/codes used by the companies.

Each time a good (or service or payment) is received or is produced by a transform, the ES 121, or the user via UI, invokes a PFTS API to record a transaction that captures information required for provenance tracking. The transaction contains: the PFTS identifier for the good or service or payment that was received or produced; timestamp identifying when the good/service/payment was received or created; whether the good/service/payment was received or whether it was transformed/produced from other goods and/or services or payments; the work/pay order, bill of materials, or transform process identifier, if any; and the PFTS identifiers of goods/products from which it was produced.

In some embodiments manual entry may be required—that is, the API is bypassed or used minimally. An example would be if the client enterprise system (ES) does not have all modules to provide the required information. For instance, a client may have modules that track information on shipping and receiving of goods, but may not have a module for work-order management and, hence, the client operator may enter transactions describing the transformation manually by utilizing an UI interface provided by PFTS. Another example of operator providing supplementary information is in case of receiving/shipping goods/services/payments that are inspected by an operator (receiver/shipper) who signs the shipping/receiving document to record the inspection.

The search and provenance graph system 1056 provides searching and reporting functionality for provenance transactions. It searches the provenance transactions stored on the blockchain 170 to search for specific provenance transactions and to determine the provenance of an item, service, or payment.

In an embodiment the search and provenance graph system 1056 provides snapshot (or summary information) of whether flows in a supply or value chain are legitimate, uncertain as to legitimacy, or contaminated (i.e., multiple risks at source are present).

In another embodiment an interface that enables production of reports on the flow of goods, services, and/or payments through the supply chain is provided. An auditor, a privileged user, or a company can obtain the provenance and flows of goods, services, and/or payments, through the supply chain, either in up-stream or down-stream direction.

The Document System 1053 stores, manages, and retrieves documents using a Datastore Interface 1180 to store the data in Datastore 180. The Document System 1053 is configured to use the Datastore Interface 1180 to store, manage, and retrieve documents in the Datastore 180.

When storing a document, the Document System 1053 also examines the document and associates it with relevant item-sets and transactions stored by the PFTS 110. As a consequence, the system is capable of supporting document retrieval requests based on the document ID and other search criteria such as (by way of non-limiting example) one or a combination of document type, date of the document, item-set ID, and transaction ID.

The Blockchain Interface 1170 accepts PFTS requests from the Transaction Processing 1050 to store transactions on the Blockchain 170. The interface communicates with the Blockchain to submit the PFTS transaction and item records for recording, performs cryptographic services for security and privacy, and communicates with the blockchain to determine the status of the request (to record a PFTS transaction).

The Data Store interface 1180 is used to interact with the Data Store 180 to store ancillary information about the transactions and their data. The data store interface 1180 is configured to store data in the data store 180 in such as way so that:

Given a company-item-ID and the company ID owning the item, find the corresponding PFTS item-set main-ID.

Given a PFTS item ID, find the most recent PFTS transaction about that item.

Given a PFTS item ID, find all PFTS transactions for that item.

Given a company ID, find all un-reconciled Ship-item and Receive shipment transactions.

Given a company ID, find all un-reconciled Change-custody and Receive-custody transactions.

Given a company ID, find all un-reconciled Give-service and Receive-service transactions.

Given a company ID, find all un-reconciled Send-payment and Receive-payment transactions.

Find all transactions that are not reconciled

Find all documents for an item-set identified by main-ID, and/or

Find all documents for a transaction identified by a transaction ID.

It will be appreciated that the ancillary data contains information that allows the PFTS to correlate, at least in part, the PFTS ID to the provenance of a specific item/service/payment. That is, the ancillary data stored in the PFTS provides, at least in part, additional information that correlates the PFTS ID to a company, owner, individual, item, service, and/or payment.

The information collected by the PFTS 110 is stored securely so that a user cannot access another company's PFTS data unless authorized. This is to prevent sensitive information from being accessible or disclosable to other users of the PFTS 110 who are not entitled to access the specific PFTS information. In some embodiments the storage and use of the collected information is secure and privacy-preserving.

In some embodiments the data can be stored, in whole or in part, on the secure data store 180. The secure data store 180 is multi-purpose data store. The data store can be implemented in hardware, software, and/or can be implemented in the cloud. The secure data store 180 is used to store data to support security, resiliency, and other functional and non-functional attributes of the system. Functional attributes/properties are features/functionality provided by a working system to reach goals/results, for instance, storing documents or transactions or listing provenance of a product. Non-functional attributes are salient properties, such as response time within a specific time period or meat-time-between failures being lower than some specification. This information can include, but is not limited to, keys, files, documents, and/or ancillary information. It will be appreciated that the secure data store 180 may be implemented in a distributed manner whereby one or more secure data stores 180 may be used.

The data collected by the PFTS is stored in a secure manner on a data store 180. In some embodiments the data is encrypted using well known cryptographic methods by the Privacy and Security System 295. For example, in an embodiment the data is doubly encrypted using public key cryptography: once using the company's public key and once using PFTS public key. In this embodiment the company has the possession of its private key—the company's information may not be decrypted unless the company itself uses its private key to decrypt the data. It will be appreciated that if the company's private key is compromised, the data is still unusable unless the attacker also obtains the PFTS's private key.

In some embodiments it may be preferable for the PFTS to store the company's private key in a separate data store. This is useful in situations where, for instance, the company is unable to cooperate in decrypting the data because the security of its systems was compromised and the intrusion resulted in the loss of private keys. In another example, the company may authorizes an agent, such as the PFTS, to use its private key to decrypt data as a matter of convenience or law. For instance, for security or public safety purposes, the public authorities may compel the PFTS operator/administrator to use the company's private key to decrypt the data to determine the provenance of some products produced or payments made by the company, or to find the down-stream flow of goods through the supply chain towards end-users/customers.

It will be appreciated that the data must be decrypted before it can be used in future transactions. In an embodiment the Privacy and Security System 295 decrypts the provenance transaction retrieved from the blockchain 170 and/or data store 180 before the data is used by the PFTS 110.

Before the transaction, related to a particular company, is stored on the blockchain, the transaction data, with the exception of the timestamp and the PFTS ID, may be encrypted using state of the art cryptographic methods. If the data on the blockchain is encrypted, it is decrypted before it is used by PFTS.

Furthermore, a company can only see the flow of goods/services/payments for those companies that allow for sharing of their information. It will be appreciated that a company can see its own information recorded directly due to its business with other companies as it is privy to such information.

In many embodiments the client user has a limited view of provenance of items as she can only request to view limited provenance of her items—limited in the sense that the provenance for a client's item is shown only if the suppliers or suppliers of suppliers of the items that were used to produce the item in question provided permission to show information about their items—this applies recursively.

FIG. 1 further depicts an Admin & Reporting System 1020. The Admin & Reporting System 1020 is a part of the PFTS 110. The Admin & Reporting System provides the admin user(s) 109 with the ability to configure multiple Client PFTSs (PFTS 1 111, PFTS 2 112, PFTS 3 113), multiple UIs (Client UI 1 131, Client UI 2 132, Client UI 3 133), and interfaces.

The Admin & Reporting system 1020 also supports provenance reporting. That is, the Admin & Reporting System can produce a report on the full provenance for any given item recorded in the PFTS 110. For instance, in some embodiments a report can be generated based on any one or a combination of the PFTS unique identifier, a company ID, and/or the item identifier used in the company's ES system. Generating a full provenance report may be required, for example, when regulatory and/or legal authorities compel the PFTS administrator to generate a report.

Referring again to FIG. 1, the network 105 represents a connection between the components so that data can be transferred between the one or more components connected to the network. In an embodiment the network 105 is the Internet. It will be appreciated that any known networking configuration can be used without departing from the scope of this disclosure. This includes, but is not limited to, private networks, virtual private networks (VPNs), and local area networks.

The blockchain 170 is used to securely and publicly store data generated by the PFTS. A blockchain, as is known in the art, is a growing list of records (blocks) that are linked using cryptography. Cryptocurrencies having a blockchain implementation are the most well-known uses of blockchain technology. In some embodiments a cryptocurrency allowing for the recording of arbitrary data is used to store data generated by the PFTS 110. For instance, in some embodiments ETHERIUM is used to store data generated by the PFTS 110. In other embodiments a general or novel implementation of a blockchain is used to store data generated by the PFTS 110. For instance, in another embodiment a blockchain is implemented exclusively for the use of PFTS users, whereby the veracity of the blockchain is verified by the users of the PFTS and other clients of the blockchain implementation.

The PFTS 110 stores provenance transaction information on a blockchain 170. The PFTS can then use the provenance transaction data stored on the blockchain to automatically summarize the status of all flows and/or suppliers of a given product or service or payment throughout slices or the whole of a value chain.

After the PFTS 110 extracts information from the work orders on services and goods that are input into the transformation and that are also produced by the transformation, one method of this invention introduces a new workflow and users and system associates unique IDs with the items that are output and information about the inputs to these transforms and their outputs, including relevant information, such as weights, quantities, hours, for both input and output goods and supplies or services. These IDs and attributes are recorded/stored in the form of transactions on the blockchain and/or in a data store.

Information received from the companies is processed and stored persistently on blockchain 170 in the form of new trading activities records (also referred to as transactions). These transactions are stored on the blockchain 170 or on the blockchain 170 and, at least in part, in a secure data store 180. Before an API method completes, all transient data is deleted, with the exception of cached information from data structures.

It will be appreciated that the PFTS and its use of the blockchain through the smart contracts form is a trust machine in that it maintains detailed knowledge can see the full details, while client-company users can only see information they provide to PFTS or information provided by other client companies that permit view of their information by other companies. In a standard operating blockchain environment, users may view summaries such as the status of the source of a material or service or payment as needed by traceability systems used in, for example, the responsible supply chains that manage the sourcing of minerals from conflict and other high-risk areas.

PFTS IDs are unique. In order to find the correlation between the PFTS IDs assigned to items/goods/services/payments and the IDs assigned to them by the companies who own them the PFTS 110 uses a data structure. The data structure is architected such that, given a PFTS ID, the PFTS 110 is able to retrieve the name of the company who have/had the good/supply/service/payment and the ID that was assigned by the company efficiently. Data structures suitable for this purpose include, but are not limited to index structures, such as a form of a B-tree data structure, e.g., a B+-tree or B*-tree, or a key-value data store.

A user may communicate with the PFTS for the purposes of requesting provenance of a particular good, service, or payment. The PFTS unique ID or the product/item/service/payment ID as used by a particular Client is used to conduct the search. If the user requests origin of a product/service/payment identified by a good/service/payment ID as known by a Client and as identified by its Client ID, the PFTS first correlates that ID to find its corresponding unique PFTS ID. Using the determined PFTS ID, the PFTS system determines the transaction(s) that describes the transformation used to produce the given good/service/payment. Furthermore, for each good/service/payment used as input to each transaction, the system determines the transactions to produce them.

In addition to creating and storing the records of trading activities/transactions that capture the provenance and flow of items/services/payments through the supply chain, the PFTS 110 also records information about the items/services/payments themselves on the blockchain: Whenever an item is registered, or received in a shipment, or received into custody, or service is received, or payment is received, in addition to the activity record/transaction being created and stored on the blockchain, PFTS 110 also creates a record about the item/service/payment itself that includes:
  i) a new unique PFTS-item-ID, referred to as main-ID, created by PFTS; item-name;
  ii) ID of the company that owns the item; units of measurements used for the item, such as quantity or volume in liters, or weight in grams, dollars in payments, hours for service;
  iii) value in measurement units, such as 5 units or 5 liters, or 5 dollars or 5 hours; and
  iv) other information, pertaining to the item, that is required for provenance and flow tracking.

For a Transform transaction, for instance, the PFTS 110 creates a new item record (with content described in the previous paragraph), and records it on the blockchain, for each of the items/services/payments produced by the Transform transaction.

For a Transform transaction, PFTS also modifies the records, of the items input into the transform process, to update the quantity/weight/volume that were consumed by the transform.

One skilled in the art may readily recognize from the description of this inventions that alternative embodiments of the structures and methods illustrated herein may be employed without departing from the principles of embodiments described herein. An example of an alternate embodiment is that the PFTS 110 may be used without recording the information about the item-sets on the blockchain—that is, trading activities transactions are simply recorded on the blockchain. In another alternate embodiment (in which information about the item-sets is recorded on the blockchain) the system may validate the request for correctness and completeness of request parameters and then ensure that there is sufficient material (quantity, volume, weight) available to fulfill the transaction. If there are errors in the input parameters or insufficient material/items, then the transaction request is unsuccessful and the returned is an error message indicating the reason for failure. In this embodiment information about item-sets stored on the blockchain represents the level of stock on-hand for the item-set, that is the quantity (number of units), and/or volume, and/or weight available (e.g., quantity of 4 tanks of pressurized chemical, of 100 litres each and/or weighing 50 kg each).

The Identity System 190 is used by PFTS to authenticate the Client ESs, Client Users, and the Admin user. In an embodiment the Identity System 190 is a standalone secured data store (e.g., a cloud-enabled data store) accessible over the network 105 that is configured to verify the identity and/or role of the PFTS users. For instance, in an embodiment the Identity System 190 is implemented in a cloud computing environment and, when an identity check request is receives, returns whether the user is authorized to use the PFTS and whether the user has been authorized to perform the requested task on the PFTS.

Referring again to FIG. 1, a Client ES 121 is a client enterprise system (ES) that is used, by the client, to internally record business transactions.

In some embodiments the PFTS 110 is configured to communicate directly with the client ES (Client ES 1 121, Client ES 2 122, Client ES 3 123). That is, the Client ESs (Client ES 1 121, Client ES 2 122, and Client ES 3 123) communicate with PFTS 110 to instruct the PFTS 110 to record transactions, including and not limited to registering, sending, receiving, paying, transforming, passing on custody, and receiving custody of an item. For instance, in an embodiment the PFTS 110 is configured to communicate with client ES's (via data requests and transfers) via the client ES's 121 API (or vice versa—that is, the client ES's 121 is configured to communicate with the PFTS 110 via the PFTS's API).

Referring again to FIG. 1, a client ES user User Interface (UI) 131 is a user interface of the PFTS 110. The client UI 131 is used by client users to use with PFTS 110. The UI 131 includes functions that would be useful for a client user. These functions include, but are not limited to, viewing the provenance of the items under control of the client and inputting information required by the PFTS to generate a provenance transaction. It will be appreciated that the number of client ES UIs (Client UI 1 131, Client UI 2 132, Client UI 3 133) will depend on the number of client ES (Client ES 1 121, Client ES 2 122, Client ES 3 123) that are a part of the system. This can be seen in FIG. 3, FIG. 2, and FIG. 3.

The client UI 131 is useful in situations where a client does not have a sophisticated ES 121 that can provide the PFTS 110 with relevant information required for provenance tracking. For instance, a small remote mine might not have an ERP system for tracking supply and production and paper records may only be kept that keep track of the weight of ore that is produced and shipped to a client. In such a situation, a client-company's operator, would log into the client UI 131 and manually enter information about the production of the ore and its shipment.

It will be appreciated that the system can be implemented on one or more computing devices having a memory, one or more processors, and a data store. In the embodiment depicted in FIG. 1 the PFTS 110 can be implemented as software stored on a non-transitory computer-readable medium. In some examples the PFTS 110 is implemented on one or more servers (or general purpose computers) having one or more processors, a memory, and a data store for storing computer instructions.

In other examples the PFTS 110 can be implemented in a distributed computing environment (such as in a cloud-computing environment, a virtualized server, etc.) so that each of the components of the PFTS 110 operates in its own computing environment having its own processor, memory, and local data store (e.g., HDD, SSD, etc.). For instance, in an example the components of the Provenance and Flows Tracking System 110 operates in its own computing environment having a processor, memory, and data store. That is, the Transaction Processing & Privacy System 1050 (having the Transaction Generation System 210 and the Privacy & Security Management System 295), the Document System 1053, the search and provenance system 1056, the blockchain interface 1170, the data structure and store interface 1180, and/or the Admin & Reporting Interface 1020 each operates in its own processing environment, each operating environment having its own processor, memory, and local data store.

Figure 2:
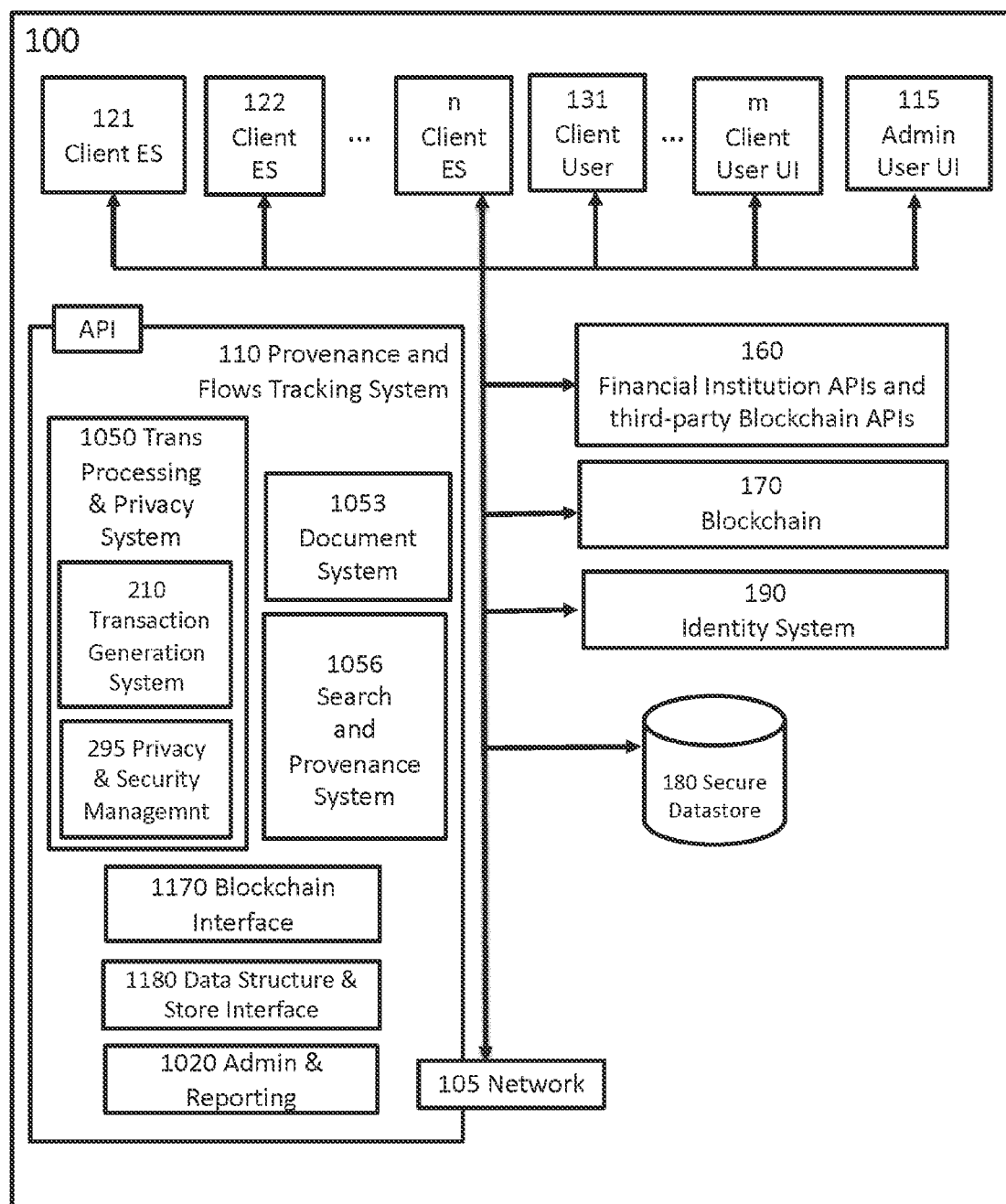
FIG. 2 (SHEET 2/21) depicts an embodiment of Provenance and Flows Tracking System (110), including the transactions preparation, and its interaction with the identity system, blockchain, and financial and third-party institution and blockchain APIs.
Figure 3:
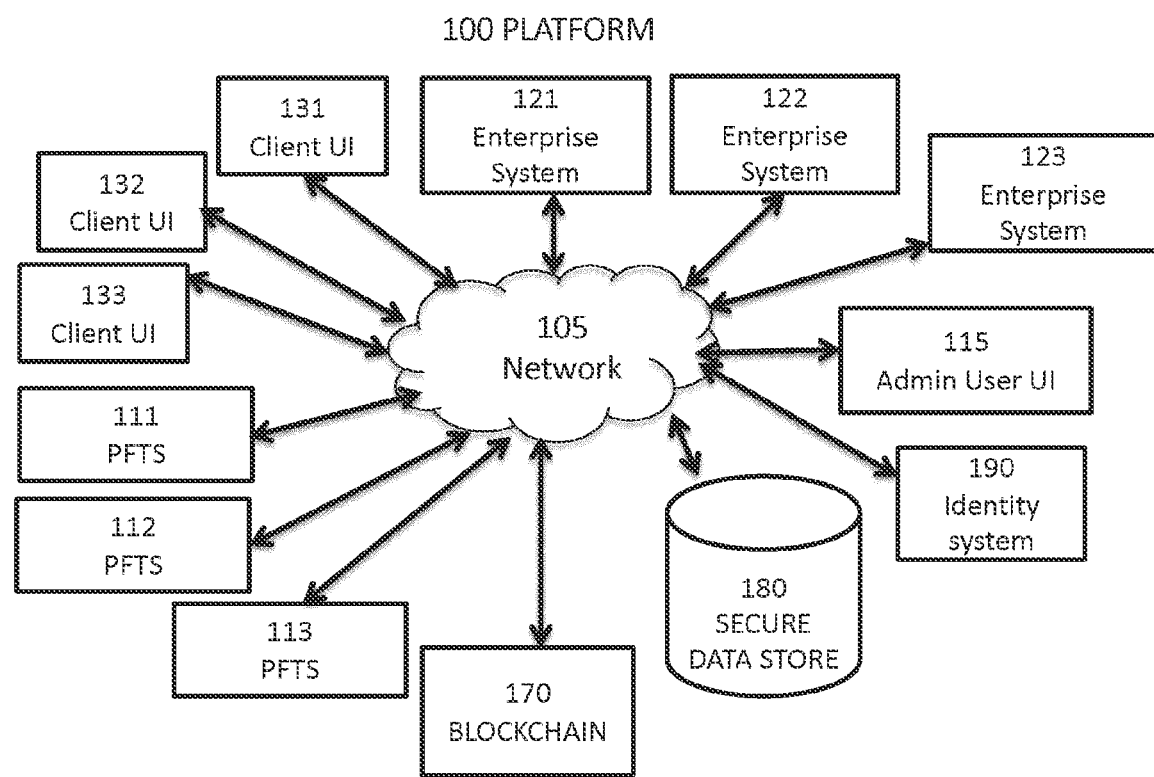
FIG. 3 (SHEET 3/21) is a block diagram depicting a responsible sourcing and payments tracking platform based on another embodiment, wherein Client PFTS1, Client PFTS2, . . . , Client PFTSn comprise the PFTS together with a blockchain and a secure data store.
Figure 4:
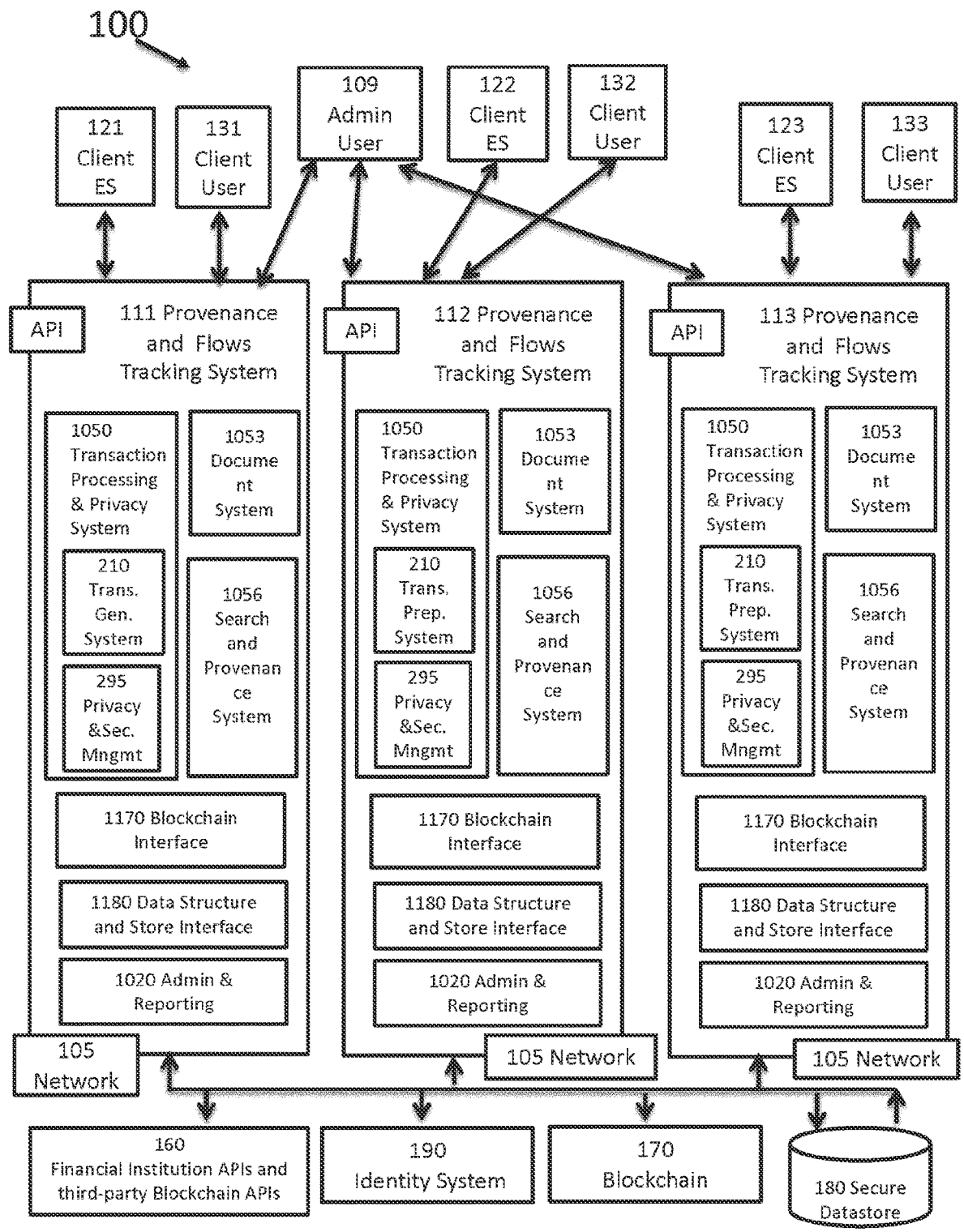
FIG. 4 (SHEET 4/21) is a block diagram depicting the details of the PFTS 110.

Referring now to FIG. 2, FIG. 3, and FIG. 4, it will be appreciated that, in each of these embodiments, several companies are a part of the PFTS 110 system. As such, each company's ES (121, 122, 123) will have an associated client UI (Client UI 1 131, Client UI 2 132, Client UI 3 133). Furthermore, a company will only be able to access their own client UI (Client UI 1 131, Client UI 2 132, Client UI 3 133) and will not be able to access the other company's UI. Furthermore, any transactions stored by a company on the PFTS 110 will not be accessible to other companies using the system unless the other company is authorized to access the data.

The Admin UI 115 is a user interface that is provided to the administrator to manage the PFTS and to request reports on the provenance and flow of item. Managing the PFTS can include, but is not limited to, adding other instances of PFTSs to the systems (if the system uses multiple PFTSs), adding users, assigning permissions, generating provenance reports on specific items, and configuring the PFTS so that the PFTS can communicate with multiple client ES's.

The admin user, via the Admin UI 115, may have special privileges to manage admin users of client companies who in turn manage their company employees, who can access the PFTS via the PFTS portal. Some admin users (such as those who are auditors) may also have special privileges to retrieve full provenance of any item. One of the circumstances where an admin user may have to use special privileges to provide full provenances is when compelled to do so by legal authorities, for example the legal authorities have a warrant to determine provenance of an item.

Referring now to FIG. 2, an alternate embodiment of FIG. 1 is depicted. In this embodiment the PFTS is configured to interface with more than one client ES and their associated users (where i=1 to n). As was discussed in FIG. 1, the administrator (via the admin UI 115) can configure the PFTS to interface/communicate with more than one client ES. In some embodiments this includes the administrator registers all its suppliers and customers with PFTS 110.

This configuration is useful in situations where the processing of an item from a raw material to a final product is performed by more than one party. For instance, consider the production of a gold bar (or coins) from raw ore. In this example a mining operation, via its client ES, would input the details surrounding the production, payment, and shipping of the ore. An intermediate processor would then use its client ES to document the transformation from ore to an intermediate product as well as any receipt, shipping, payment, or distribution details. Once a final producer receives the intermediate product, the final producer would input details regarding the receipt of the product, payment, transformation, processing, final production, or other details regarding its handling of the intermediate product/final product. In this way multiple parties can document the provenance of the final product from the initial source raw material (i.e., the ore).

Referring now to FIG. 3 and FIG. 4, these figures depict an alternate embodiment of FIG. 1 where more than one PFTS is provided. This embodiment may be used where each client ES (e.g., 121, 122, 123) is configured to work with its own PFTS instance (111, 112, 113). That is, PFTS 111 serves only requests from Client ES 121 and Client UI 131 and PFTS 112 serves only requests from Client ES 122 and Client UI 132. This distributed architecture is useful in situations where redundancy or parallel processing is required. In some embodiments the PFTS instances (111, 112, 113) may synchronize regularly (every second, minute, hour, day, etc.) to ensure that transactions (or ancillary data) are available on each PFTS such that provenance transactions on the blockchain can be recovered or otherwise utilized.

FIG. 4 is a block diagram showing the details of the PFTS 113 for the embodiment of FIG. 3. In FIG. 4, PFTS is comprised of multiple PFTS instances: Client PFTS 111, Client PFTS 112, and Client PFTS 113, wherein Client ES 1 121 and Client User 1 131 communicate with Client PFTS 1 111, Client ES 2 122 and Client User 2 132 communicate with Client PFTS 2 112, and Client ES 3 123 and Client User 3 133 communicate with PFTS 3 113. The figure shows details of an example Client PFTS 113 that processes requests coming from one company, either from Client ES 123 and/or Client UI 133 (Client ES 123 and the user utilizing User UI 133 are assumed to be with the same company). The Transaction Processing system 1050 of PFTS 113 has the same functionality as described for Transaction Processing system 1050 described for FIG. 1—however, it processes only requests coming from one client company, that is either from Client ES 123 or Client UI 133. The Transaction Processing 1050 generates transactions and stores them on the BC 170 using the Blockchain (BC) Interface (BC IF) 1170. It also stores ancillary information to support efficient processing in the Data Store 180 using the Data Store Interface (DS IF) 1180.

Each Client ES (121, 122, 123) has a pair of keys, one public and one private key, that are used for encryption/decryption and non-repudiation. Client ES (121, 122, 123) provides PFTS information on its trading activities. Before the Client ES (121, 122, 123) forwards the trading activity information to PFTS, it first hashes it using a one-way hash function, such as SHA-256, to create a hash-code. It then encrypts the hash code using its private key and includes the hash code, together with the trading-activity information to PFTS 110. The hash-code forms a signature that is used as a proof that Client ES (121, 122, 123) indeed did provide PFTS 110 with the trading activity information. Once PFTS 110 receives the input, consisting of the trading activity information and the encrypted hash code, it hashes the trading activity information using the same one-way hash function as the Client ES (121, 122, 123) did and then compares the resulting hash code to the hash code provided by ES, but decrypted using the Client ES's (121, 122, 123) public key. The two hash-codes should match—if not, PFTS 110 restarts the process of obtaining trading activity information from Client ES (121, 122, 123). It will be appreciated that other ways of signing or otherwise ensuring that the data originates from the Client ES can be used without departing from the scope of this disclosure.

A high-level overview of how an embodiment of the system 100 processes a transaction request is now provided. First, a request from a client ES 121 (or client UI 131 if the request is entered via the UI interface) is sent to the Provenance and Flows Tracking system 110. The request is then authenticated with the identity System 190 to ensure that the client user has sufficient authorization/permissions to execute the request.

Once authenticated, the request from the Client ES 121 (or client UI 131) is forwarded to the transaction processing system 1050 if the request is a transaction. Any requests from the Admin UI is, after authentication, are processed by the Search-and Provenance-Graph System 1056.

If the request is for recording provenance-related trading activities that generate transactions (or provenance transactions), then the request is processed by the Transaction Processing System 1050. The transactions are then processed and stored on the blockchain and, at least in part, in the secure data store.

Reconciliation is then performed for the receive-item transactions, receive-custody request, receive service, and receive payment transactions. Reconciliation involves updating the corresponding ship-item, transfer-custody, give-service, and send payment transactions. Additionally, if the request requires the storage or retrieval of a document, the request is directed to the Document System 1053.

After the transaction is generated as per request message being processed, it is recorded on the Blockchain 170 using the BC Interface 1170. Finally, ancillary functions are performed to update fast access methods that are stored in Data Store 180 by using the Data Store Interface 1180 and the requesting Client ES or Client UI is informed of the success/failure of processing the request.

Figure 5:
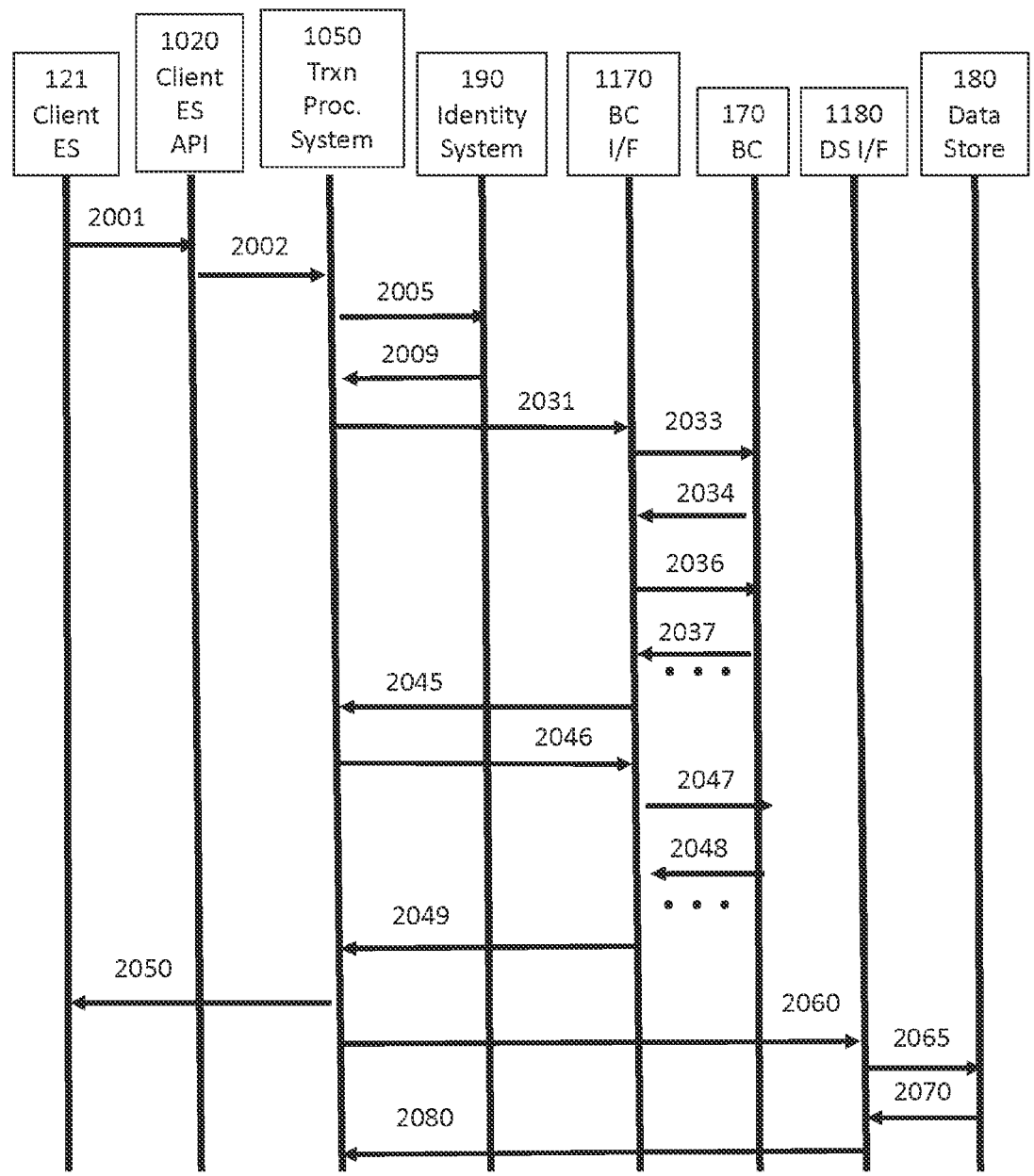
FIG. 5 (SHEET 5/21) is a diagram depicting an embodiment of the exchange of message between a Client ES and the PFTS system.

FIG. 5 depicts an example detailed messaging sequence of how a request is processed in an embodiment of the PFTS 110. In this embodiment a Client ES 121 (or a user at Client UI 131), sends a request message 2001 to the Client ES API 1020 to record a PFTS transaction (and potentially data records) on the blockchain 170. The Client ES API directs the request 2001 as a request 2002 to Transaction Processing 1050.

When the request 2002 is received by Transaction Processing 1050, it is first authenticated by extracting the credentials from the request 2002. The credentials are then included in the message request 2005 sent from Transaction Processing 1050 to the Identity System 190. The Identity System 190, then authenticates the user. Note—it is assumed that the Client ES 121 (or the user at Client UI 131) has been registered for authentication with the Identity System 190 prior to issuing any requests to PFTS 110.

The Identity System 190 then sends a reply 2009 to Transaction Processing 1050 indicating whether authentication was successful. If authentication was not successful, Transaction Processing 1050 indicates in its reply message 2050 to Client ES 121 (or Client user UI 131) that authentication failed.

Once the user has been authenticated, Transaction Processing 1050 examines the remaining input from the request and generates a new PFTS transaction. The new PFTS transaction has a unique transaction ID that will be recorded on the Blockchain 170. In this embodiment, input parameters of the request message 2002 to the Transaction and Privacy Processing System 1050 are parsed and checked for correctness. Further processing then depends on the source of and the content of the request message 2001.

Transaction processing 1050 then prepares the content of the transaction. The preparation of the transaction will depend on the type of the transaction received in the request. If the transaction is of type:
  i. Receive-item, Receive-custody, Receive-service, or Register-item—then Transaction Processing 1050 prepares a new item-set record containing information about the item-set as received in the request message 2001 and assigns it, and records in the newly created item-set record, a new PFTS main-ID. It also includes in the new transaction information about the item-set, including the newly assigned PTFS main-ID. The item-set record and the transaction record are stored on the blockchain 170.
  ii. Transform—then Transaction Processing 1050 prepares a new item record for each item produced by the transform and stores in it a newly assigned PFTS main-ID and other information from the request 2001. The item records are written on the blockchain 170. The transaction information is updated to contain the information (main-IDs assigned by PFTS to newly created item-sets) about the item-set.

Once Transaction Processing 1050 completes generating the PFTS transaction, Transaction Processing 1050 then submits a request 2031 to the Blockchain Interface 1170 (BC I/F), to write the newly prepared transaction (and possibly data items) to the blockchain 170. The request 2031 contains the transaction to be recorded and, if the transaction type was not Ship-item or Change-custody, it also includes one or more item records.

The Blockchain Interface (BC I/F) 1170 sends a request message 2033 to the blockchain 170 to record the PFTS transaction and includes the transaction content in the request message. Blockchain 170 returns to the BC Interface 1170 a message 2034 containing indication of success/failure. If the message 2034 indicates failure, that failure is communicated to the Transaction Processing 1050 in the message 2045, which is then communicated in the message 2050 to the Client ES 121.

If the message 2045 indicates success and the transaction recorded is of type Ship-item or Change-custody, then Blockchain Interface 1170 indicates in response 2045 the corresponding success to the Transaction Processing 1050, which then communicates the success in the message 2050 to the Client ES 121.

If, however, the transaction type was one of Receive-item, Receive-custody, Register-item, or Transform, then the Blockchain Interface 1170 communicates with the Blockchain 170 to store an item-record—it sends to the Blockchain 170 a request message 2036 to store an item, which is stored in the message. The Blockchain 170 responds with a message 2037.

If the transaction was of Transform-type and there are further output items to be recorded, this process, request by BC Interface 1170 to record an item and a response from Blockchain 170 to BC Interface 1170, repeats once for each additional item record to be stored on the blockchain 170.

Once Transaction Processing 1050 receives the response 2045 from the Blockchain Interface 1170 and the message indicates success and the transaction type was Transform, then the Transaction Processing 1050 submits a request 2046 to the Blockchain interface to update item records on the Blockchain 170: one update for each of the items serving as input to the transform. Each item, which served as input to the transform, must be updated to decrease the quantity/weight/volume, as is appropriate, of the item depending on how much of the item was consumed by the transform. The Blockchain Interface 1170 sends a request 2047 to update the first item serving as input to the transform, while the message 2048 is the response from the Blockchain 170 to the Blockchain Interface 1170. This exchange repeats for each additional item that served as input to the transform.

Once the transaction is stored on the blockchain and, if necessary, item records are also stored on the blockchain 170, then Transaction Processing 1050 submits a request 2060 to the Data Structure Interface 1180 to write ancillary information to the Data Store 180—information to be written includes the PFTS Transaction ID; the item ID as used by the Client ES 121 to identify the item; the PFTS item ID; if the transaction is Ship-item, record that the transaction is un-reconciled; if the transaction is Change-custody, record that the transaction is un-reconciled. Data Structure Interface 1180 submits a request 2065 to the Data Store 180, which stores the requested information and responds with a message 2070 to the DS Interface 1180, which then responds with a message 2080 to Transaction processing 1050.

Figure 6:
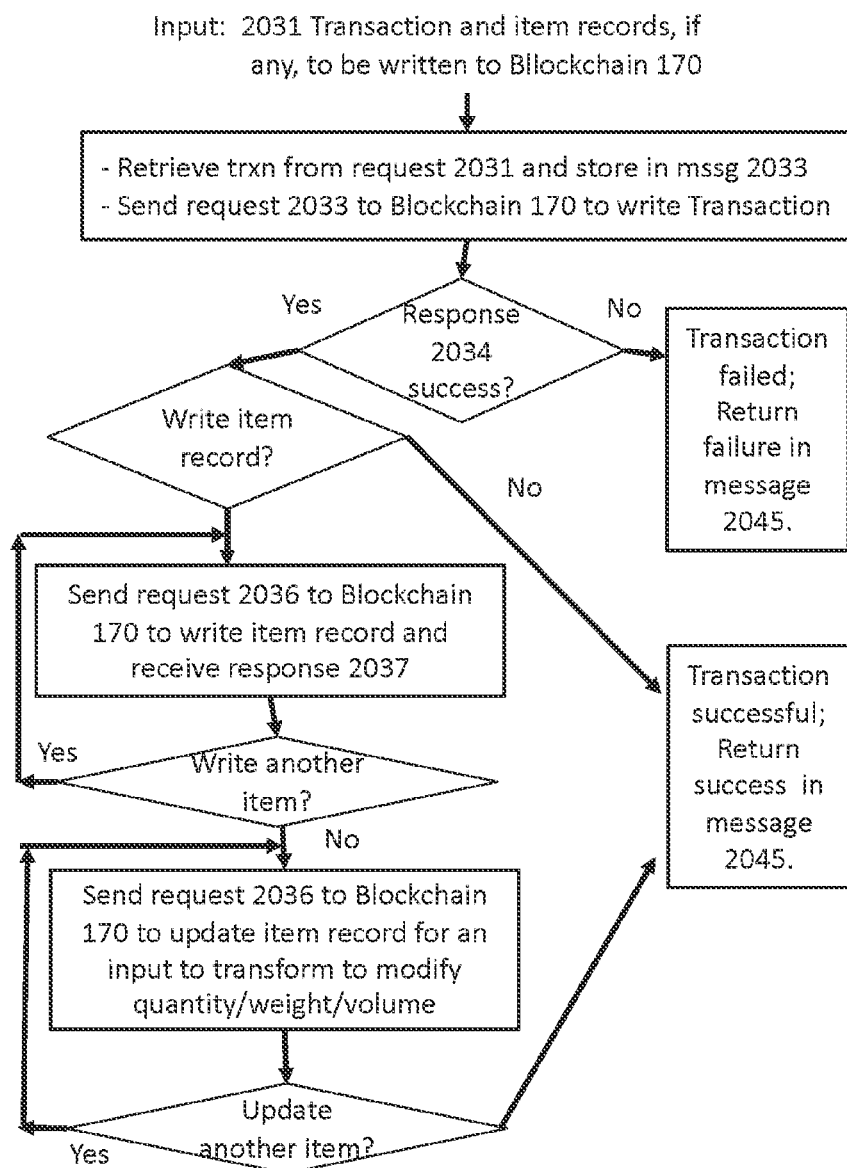
FIG. 6 (SHEET 6/21) depicts an example process executed by the Blockchain Interface 1170 when writing a transaction and item records on the Blockchain 170.

FIG. 6 depicts an example process executed by the Blockchain Interface (BC I/F) 1170 when writing a transaction and item records on the Blockchain 170 according to the messaging sequence of FIG. 5. The BC I/F first retrieves the transaction from the request 2031 and prepares a request message 2033, which includes the retrieved transaction, for the Blockchain 170 to write the transaction. When the blockchain responds, if the response is negative, the transaction writing on the blockchain failed and the Transaction Processing is informed of this in the message 2045. If it was successful, 1170 stores an item record on the Blockchain 170 if the transactions was not either Ship-item or Change-custody. The BC I/F sends a request message 2036 to the Blockchain 170 to record an item. If the transaction was a Transform transaction which is either one-to-many or many-to-many, then there are one or more item still to be written to the blockchain 170, as there is one item record written for each item produced by the transform.

FIG. 7 depicts an example of PFTS transactions stored on the blockchain. In this example a transaction having a transaction ID of 101, is used to register an item by company 501. The company identifies the item using a its company-item ID 601, while PFTS 110 uses a PFTS item ID of 301. The item was received from a supplier having a supplier-ID of 701.

The transaction with a transaction ID of 102 is for recording an item that was received from a supplier having a supplier ID of 701.

It should be noted that both suppliers, identified by owner-company-ids of 701 and 702 respectively, are not participating in the PFTS platform 100.

The transaction with an ID 105 represents a transform, made by the owner company with the company-ID of 501, that produced item with PFTS ID of 305 and the company-item-ID of 605. The inputs to the transform, which produced the item having ID 305, includes an item with a PFTS ID of 301 and an item with the PFTS ID of 302. The transaction is an example of a many-to-one transform.

The transaction with an ID of 104 is for registration of an item with the PFTS-item-ID being 306 (many tons of ore).

The transaction having transaction id of 112 is for a one-to-many transform that produced the items with transactions having PFTS ID of 315 and PFTS id of 316. Input to the transform that produced these items was 20 tons of the item having the PTS ID of 306 (thus only a part of the item 306 was used in the transform to produce the item with the PTS ID 315).

The transaction with the Transaction-ID of 120 is for a shipment of the item with the PFTS-item-ID of 316. The shipping document ID is 901 and the line number on the shipping document that describes the item being shipped is line number 4. The transaction has already been reconciled as the Receive-item transaction for the item has an ID of 130.

The transaction having a transaction ID of 130 represents the reception of the item with the PFTS-item-ID of 330 that was shipped as recorded by the Ship-item transaction (i.e., the transaction having the transaction id of 120).

In the context of the transactions having ids of 120 and 130 respectfully, the item that was shipped and then received, was identified by the shipping company (having a company ID of 502) using the company-item-ID of 616, while the same item when received by the company with an ID of 509, is identified by using the company-item ID of 630. The PFTS, on the other hand, used a unique PFTS-item id of 316, for the item having an id of 616 of the company (company ID=502), and a PFTS-item-ID=330 for the item=630 of the company=509.

Transaction with the ID of 140 is an example, illustrated in the last cell of the table, of a company id=501 executing a many-to-many transform transaction having a transaction id of 140. Two items with existing the PFTS identifiers of 330 (2 in qty) and 305 (1 in qty), are input in a many-to-many transform transaction and two new outputs are generated with two new identifiers—that is, PFTS transaction id=340 (company item-identifier=625) and 345 (company item-identifier=636). One output, transaction id=340, comprises 2 gold coins that are half a kilogram in weight. The second output consists of 10 gold coins each of 0.1 Kg in weight. The remainders/residues of the input items are recorded.

Figure 8:
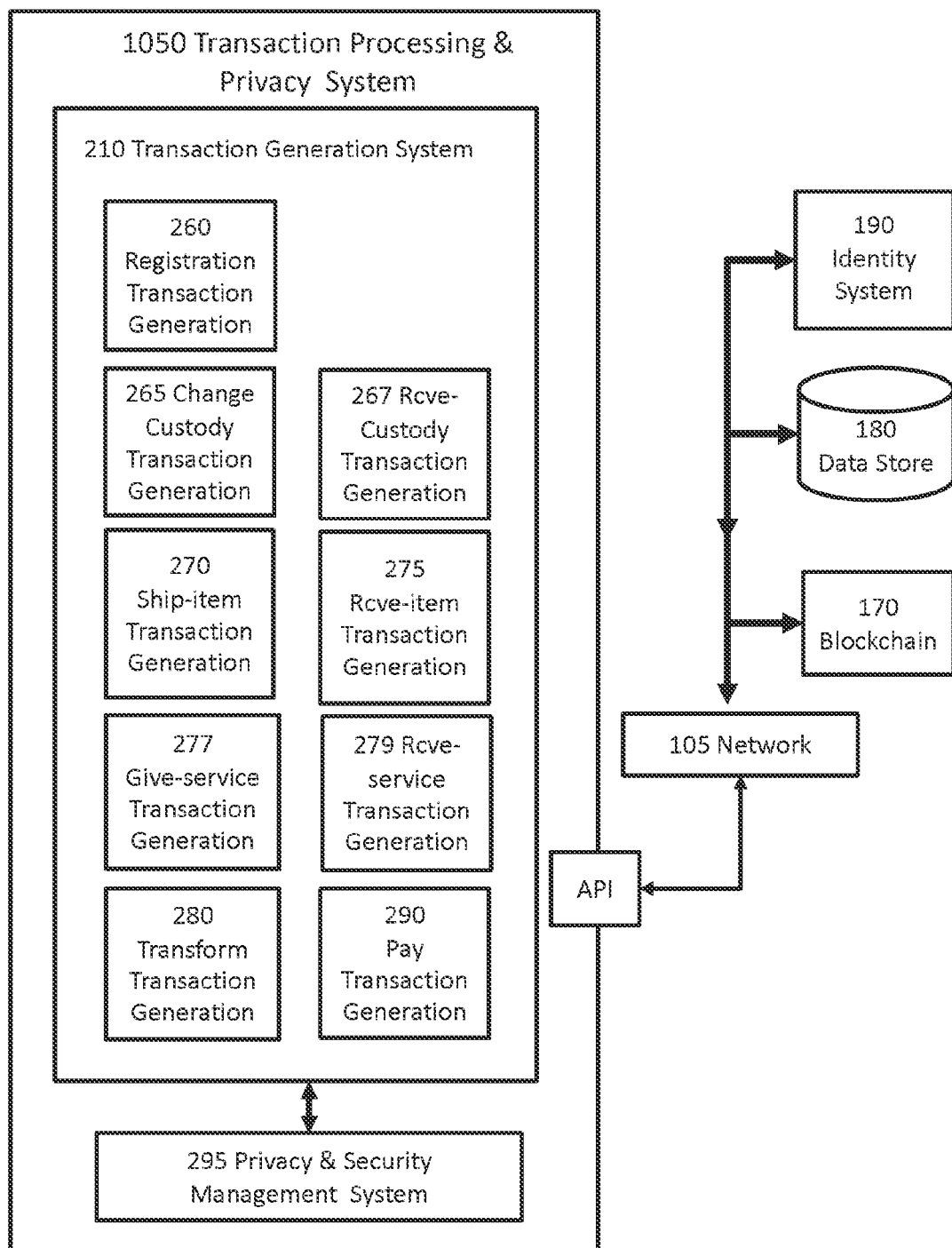
FIG. 8 (SHEET 8/21) is a block diagram depicting an embodiment of the different transaction generation processes within the Transaction Preparation system, and the Transaction Preparation System's interaction with Privacy Services, Identity System, the Data Store, and Blockchain.

Referring now to FIG. 8, the Transaction Processing System 1050 facilitates recording of the goods, services, and payment transactions for tracked goods and services. The transaction processing system 1050 includes a Transaction Generation System 210 and Privacy and Security Management System 295.

The Transaction generation system 210 generates transactions according to one or more processes. The process invoked will depend on the request type received. These processes include, but are not limited to registration transaction generation 260, change custody transaction generation 265, receive custody transaction generation 267, ship-item transaction generation 270, receive item transaction generation 275, give-service transaction generation 277, receive-service transaction generation 279, transform transaction generation 280, and payment transaction generation 290. The Transaction Generation System 210 interacts with the data store 180, blockchain 180, and the privacy and security management system 295.

Figure 9:
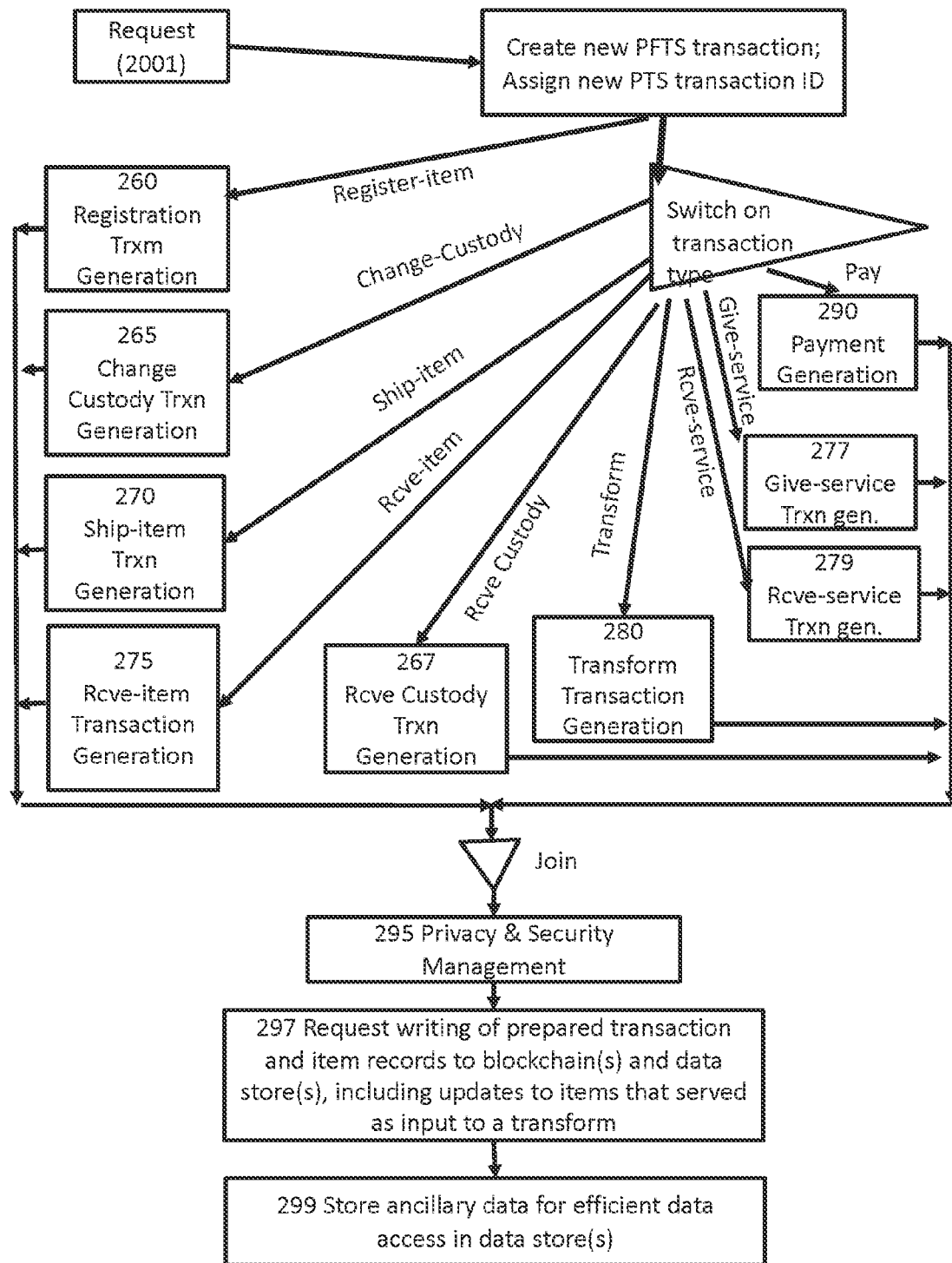
FIG. 9 (SHEET 9/21) is a diagram depicting embodiment of the process for issuing a transaction, associated with the responsible sourcing of goods, services and payments tracking platform, onto one or more blockchains.

FIG. 9 is a flowchart depicting an embodiment of the Transaction Generation System 210 after receiving a request 2001. Once the sender has been successfully authenticated, the PFTS transaction is generated based on the request. The Privacy and Transaction Generation System 210 then prepares an activity record transaction. The activity record transaction includes information generated by the Privacy and Transaction Generation system 210 and information obtained from the request message 2001. This information includes, but is not limited to:

i) a unique transaction (activity record) ID that is assigned by the Privacy and Transaction Generation System 210 and is stored as a part of the record on the ledger;

ii) a Transaction type denoting one of the following transactions that should be generated: Record-item, Ship-item, Receive-item, Change-custody, Receive-custody, Give-service, Receive-service, Payment, and Transform-item.

iii) information about the company owning the item(s) in question;

iv) for each transaction type (except the Transform type and the payment type) information about the item-set that is the subject of the request, including the PFTS main-ID, Company-item-ID and other information that is of interest for the purposes of provenance tracking. Examples include the item name as used by the owning company, assay, weight, quantity, and other information that may depend on the item itself; and v) A timestamp of when the trading record is submitted for recording or when it is being recorded, and the identification of the user or a system that has initiated the recording activity.

Transaction Processing 1050 then examines the transaction type and, depending on the transaction type, it invokes an associated process, such as registration, change of custody, receive custody, and so on. If the transaction type is not of Transform or Payment type, then Transaction Processing 1050 copies information about the item from the request 2001 into the new transaction:

a. PFTS-item-ID
b. Company-item-ID c. Item name
d. other item information pertaining to provenance and flow tracking If the request 2001 is for Register-item transaction to be recorded, then the item included in the request has been
a. either received from a supplier who does not participate in the PFTS platform 100, i.e., is from a supplier who is not a PFTS client, in which case the supplier ID must is included in the request,
b. or the item has been created "from scratch" w/o any items input into its creation in the context of provenance tracking—for example, the owner company is a mine who dug up ore and is recording with PFTS.

If the transaction type is not of Transform or Payment type, then depending on the transaction type, additional information may be required. If the transaction type is:
a. Register-item: If the item was received from a company/supplier that is not a part of the PFTS platform 100, i.e., a company that does not communicate with PFTS 110, then the company-ID of the supplier is included. It is assumed that a client company that is a part of the PFTS platform 100 registers all its suppliers with the PFTS 110, and thus each supplier/company has a unique company ID.
b. Shipping-item—also included are:
i. Transaction ID of the corresponding Receive-item transaction. When the Ship-item transaction is first recorded upon shipment of the item, this field/information is set to "unknown" as the item is just being shipped and has not been received yet. When the item is received by the receiving company and a Receive-item transaction is created and recorded, reconciliation process is executed to set this information (field Receive-item transaction ID in the Shipping-item transaction).
ii. Information on the shipping document, including receiving company ID, shipping document ID, reference to the part of the document, e.g., a line number, where information about the item being shipped can be found within the shipping document.
c. Receive-item: Also included is the ID of the corresponding Ship-item transaction ID that is determined by reconciliation (i.e., it is not included in the request 2001).
d. Change-custody—also included are:
i. Transaction ID of the corresponding Receive-custody transaction. When the Change-custody transaction is first recorded, this field/information is set to "unknown" as the item's custody is being changed, but the custody has not been received yet. When the item's custody is received by the receiving company and a Receive-custody transaction is created and recorded, reconciliation process is executed to set this information (field Receive-custody transaction ID in the Change-custody transaction).
ii. Information on the change-custody document, including receiving company ID, change-custody document ID, reference to the part of the document, e.g., a line number, where information about the item with the custody change can be found within the document.
e. Receive-custody: Also included is the ID, of the change-custody document, that is determined by reconciliation.
f. Give-service—also included are:
i. Transaction ID of the corresponding Receive-service transaction. When the Give-service transaction is first recorded, this field/information is set to "unknown" as the service is being initiated but not yet completed. When the service is received by the receiving company and a Receive-service transaction is created and recorded, reconciliation process is executed to set this information (field Receive-service transaction ID in the corresponding Give-service transaction).
ii. Information on the give-service document, including the receiving company ID, Give-custody document ID, reference to the part of the document, e.g., a line number, where information about the service can be found within the document.
g. Receive-service: Also included is the ID, of the Give-service document (and a line number if appropriate), that is determined by reconciliation.

Recall that we use the term/word "item" to refer not only to a product, such as a widget, but also to supply, such as a ton of ore, or a volume of liquid chemical, or to a service, or funds. For instance a description of an item may refer to a description of a service, such as a know-your-customer service. Similar to the two pairs of transaction types, namely Ship-item and Receive-item, and Give-custody and Receive-custody, when one company gives/provides a service to another company, there are two PFTS transactions recorded with that service, a transaction Give-service, which describes details of the service given by a company to another one, while the Rcve-service transaction describes details and confirmation of receiving a service. When the Give-service transaction is created, in addition to the unique PFTS transaction ID and the client service description ID, service name, and other information describing the service, also provided is the ID of the document used to order the services and, if the document describes a number of different services organized as lines or their equivalent, such as objects, then it also includes line number on which the service has been ordered. Also included is the ID of the corresponding Rcve-service transaction. Of course, when the Give-service transaction is recorded initially, the ID of the corresponding Rcve-service transaction is not known and hence it is set to null.

In some situations, the custody of goods may change. For instance, a buyer may purchase a quantity of gold bars, but does not wish to take their possession. The seller may offer to store the gold bars, in which case the purchaser is the new owner but can leave the custody of the goods to remain with the seller, possibly through a rental space arrangement similar to renting a safety deposit box in a bank. When custody of an item changes, and both the item owner and the receiver of custody are PFTS clients, then two transactions are recorded on the blockchain via the PFTS.

Upon receiving information from a Client ES, or the client-company user connected to the PFTS user portal, that a service was received, the Client ES or the client-company user provides the PFTS with information about the service, including the ID of the Invoice issued to seek payment for the provided service, which also includes an ID of the order service document and a line number on which the service was ordered. When PFTS receives this information about a reception of a service, the PFTS correlates the Invoice ID, document identifier or some other business document containing the description of the received service, with the Give-service transaction information recorded by the PFTS for the service provisioning company. The correlation/matching of the received service to the service order is done using the order service document ID, which also appears on the invoice, and the line numbers. When correlation is achieved and the received service is matched with the order service recorded by the PFTS:

i. PFTS records a Rcve-service transaction that contains information about the received service and the ID of the corresponding/correlated Give-service transaction.
ii. PFTS updates the Give-service transaction to include the matching Rcve-service transaction (the Rcve-service transaction ID is recorded within the Give-service transaction).

After the successful correlation of the received service Invoice with the order-service document, PFTS records, in the Give-service transaction, the ID of the Rcve-service recorded by the receiving company. Similarly, in the Give-service transaction, PFTS records the ID of the transaction for receiving that service (Rcve-service transaction).

A payment transaction captures information on payment of one or more invoices containing a number of item-sets. Information, obtained from the client company user, via a web portal, or a client company ES, includes identification of invoices and on accounts used for payments, including how much should be paid from which account and for which invoice, as well as instruction on whether and how to proceed with payments if one or more accounts do not have sufficient funds for payments at the indicated levels. The accounts may be of various types provided by financial institutions or accounts for digital currencies. For instance, for a bank, information would include route information, including the bank ID, branch ID, and the account ID, while for Bitcoin account, the address of the account (hex address is used by Bitcoin to identify accounts).

In one example embodiment, the payment settlement has been done and the request is for creation and storage of the payment transaction, including details on how much was paid from which account for which invoice. In another embodiment, the request is for payment execution, in which case, the payments indicated from digital currencies accounts are processed first by invoking appropriate payment methods available through APIs provided by digital currency systems in question. Following this payments are made by using payment APIs for clearing of payments made from accounts provided by financial institutions. A PFTS trading activity payment transaction is prepared to record the results of the payments executed and the transaction is stored in the ledger.

Another type of transaction is the transform transaction. A transform transaction represents the transformation of an item from one form to another.

Goods may be produced through transformation of input goods into output goods. For instance, a 1-kg box of gold nuggets can be transformed into 1-kg gold bar, which represents a one-to-one (SISO—single input-single output) transformation transaction, which is made immutable on the blockchain. A different transformation is many-to-one (MISO—multiple inputs, single output), wherein many goods are transformed into (are used to produce) one. For instance, many parts may be assembled into one item. All identifiers in the transformation process are recorded on the blockchain and some ancillary information is recorded in a data store. Yet another transformation is one-to-many (SIMO-single input, multiple outputs), wherein one item/supply is used to produce many items. As an example, one 2-kg gold bar may be used to produce 10 coins, each weighing 200 g each. The new output items are registered on the blockchain, and the quantity of the input material/items decremented by how much was used in the transform. Finally, there is also a many-to-many (MIMO—multiple inputs, multiple outputs) transform in which many goods are transformed into many different goods. As an example, a 2-kg box of gold nuggets and 1.3 kg of recycled gold is transformed into one 2-kg gold bar of certain assay and two 0.5 kg gold bars of certain assay (assay of input items may be different from assay of output items). Another variation of the transform is when a registered item is modified by some process that adds value to the item, for instance a car, that was produced already by a client company and has been registered with PFTS, but before the car is being shipped to a customer, the car is customized according to the final customer instructions, for instance by adding some additional optional part(s), and/or perhaps or by adding decals, or by painting it in particular color. In such a situation, the client company may wish to record this customization of the car, but may not consider the car to be a new product. Such information is recorded by PFTS as a multiple input-zero-output (MIZO) transaction, which is used to record the customization information, wherein the transaction has, as one its inputs, information about the car being customized while the other inputs would be materials or parts being added or used in the customization process. Information about any process used in customization is also recorded by keeping in the PFTS transform transaction a reference/location-pointer, to the work order, or transform template, being used for the customization process.

A transform transaction is created and stored on the blockchain, and it records the information about the item-sets input into the transform process and also information about the item-sets that were produced, plus other information, such as production protocol used or loss of material due to residue on forms.

In addition to looking after the transaction information, for a transform that is not MIZO, PFTS also creates a new record about each of the items produced by the transform and includes in it the newly assigned PFTS-item-ID, Company-item-ID and other information as already described above for the Receive-item transaction. The record is stored on the blockchain. For a transform that is MIZO, the item description, of the item being modified by the MIZO transform, may be augment by information about the work-order, or its equivalent, being used to modified the item.

As the transformation utilizes input items to produced output items, in addition to creating and storing a transaction that describes the process and a new record for each item that is produced, the PFTS also updates information, on the blockchain, about each item that was used as input. For each input item, PFTS updates, on the blockchain record, the quantity/weight/volume of the item is updated as it was consumed by the transform.

Referring again to FIG. 9, the transform transaction type includes information:
a. Work-order ID/transform-template-ID that describes the transform, including information which how much of each item-set used as input by the transform is required and used by the transform, including any percentage residue waste, for instance residue on a form, or consumption of an input item, for instance consumption of a catalyst (input item) used in a chemical process.
b. Which type of transform it is, which is one of 1-to-1 (Single-Input to Single-Output (SISO)), many-to-one (Multiple-Input to Single-Output (MISO)), 1-to-many (, many-to-1 (Multiple-Input to Single-Output (MISO)), many-to-many (Multiple-Input to Multiple-Output (MIMO)), or many-to-zero (Multiple-Input to Zero-Output (MIZO)), in which case the the input in message 2001 also identifies which item is being modified by the transform.

c. For each item, referred to below as a supply item, used as an input to the transform, the following information is included:
   i. PFTS main-ID.
   ii. If appropriate for the transform and the input item, the fraction of the weight/volume of the supply item that was consumed (not all the supply item may have been used for the production of the item that is the subject of the request), or a residue, efficiency, or waste factor. For example, only 96 kg of the supply item may have been used out of 100 kg.
   iii. If appropriate for the transform and the input item, if the supply item has quantity (e.g., 20 of item with ID "12345id"), then the quantity of the supply item used to produce the item by the transform. For example, the supply item "12345id" may have had a weight of 50 before the transform, but as the transform consumed 20 weight units, after the transform the supply item would have 30 weight units.
d. If the transform type is not MIZO, then for each new item-set created by the transform, a new item record is created that includes the following information:
   i. PFTS-item-ID.
   ii. Weight, volume, and quantity and any other information as is appropriate for the item.
e. If the transform is of MIZO, instead of creating a new item record, the method modifies the item record for the item being modified by the transform with additional information that includes the work-order ID used for the transform and also updated information on the item being modified as described by the work-order, for instance, the transform may have included painting, in which case the attribute color may be updated or, as another example, an optional part may be added to the item being modified, in which case, weight may be increased to account for the new part being added.

If the transaction is of the Payment type—also included is information on:
a. For each of the accounts used as source of funds for the payment
   i. Information on the source account that depends on the type of account. For instance, for a bank, it would include route information, including the bank id, branch ID, and the account ID, while for Bitcoin account, the address of the account (hex address is used by Bitcoin to identify accounts).
   ii. For each transfer from that account to another account:
   1. Total amount transferred/payed
   2. Recipient account information
   3. Confirmation ID of successful transfer
b. For each of the accounts used to receive funds for payment
   i. Information on the account, which depends on the type of account. For instance, for a bank, it would include route information, including the bank id, branch ID, and the account ID, while for Bitcoin account, the address of the account.
   ii. For each transfer into that account to another account:
   1. Total amount transferred/payed
   2. Information on the account from whence the funds were received
   3. Confirmation ID of successful transfer Referring again to FIG. 9, after receiving the request 2001, Transaction Processing 1050 prepares a new PFTS transaction. It creates a new unique PFTS transaction ID and stores it in the new transaction together with the current time-stamp. Thus, each transaction has the following information:
   a. PFTS transaction ID
   b. PFTS transaction type
   c. timestamp of the transaction when it was created In FIG. 9, for all transaction types, after transaction preparation and generation, the data are processed through a privacy and security management system 295, and then the transaction is issued to the blockchain. Any new item records created by the transaction processing are also issued to the blockchain as are any updates to the input items and, for the MIZO transaction, update to the item record for the item being modified.

The privacy and security management system 295 uses state of the art encryption mechanisms to securely store data. In some embodiments the transaction data (not including the transaction ID or the timestamp) are encrypted. If a public key cryptography is used and the data is encrypted using the public key of the company, the company's private key is required for decryption. In another embodiment, the data is encrypted such that only PFTS is in possession of the key. In some embodiments the keys are stored on the secure data store 180.

The privacy and security management 295 is also used for privacy. In an embodiment, the secure data store 180 contains a description of the transaction data format, including a description that determines which parts of the transaction information contains personally identifiable information (PII), if any. The privacy and security management system 295 uses this information to apply anonymization to remove the PII and store it in the secure data store 180. The fields that originally contained PII are replaced with one or more references (linking information) that is used to locate the PII stored on secure data store 180.

Referring now to FIG. 10 to FIG. 13, additional details for each of the processes described in FIG. 8 and FIG. 9 are provided, below.

Figure 10:
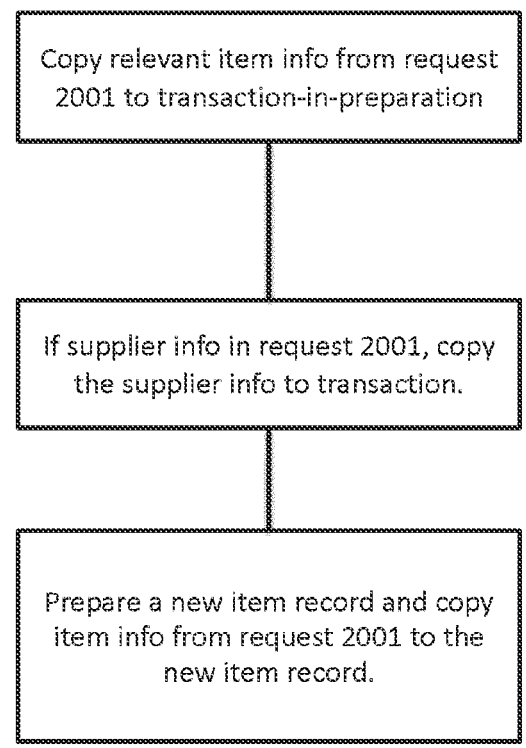
FIG. 10 (SHEET 10/21) is a diagram depicting an embodiment of the process for the Registration Transaction Generation.

As depicted in FIG. 10, for a Register-item request type, Transaction processing 1050 invokes the Register Transaction Generation process 260. The Register Transaction process 260 includes the supplier information into the new transaction if the supplier/company ID is included in the request 2001.

Figure 11A:
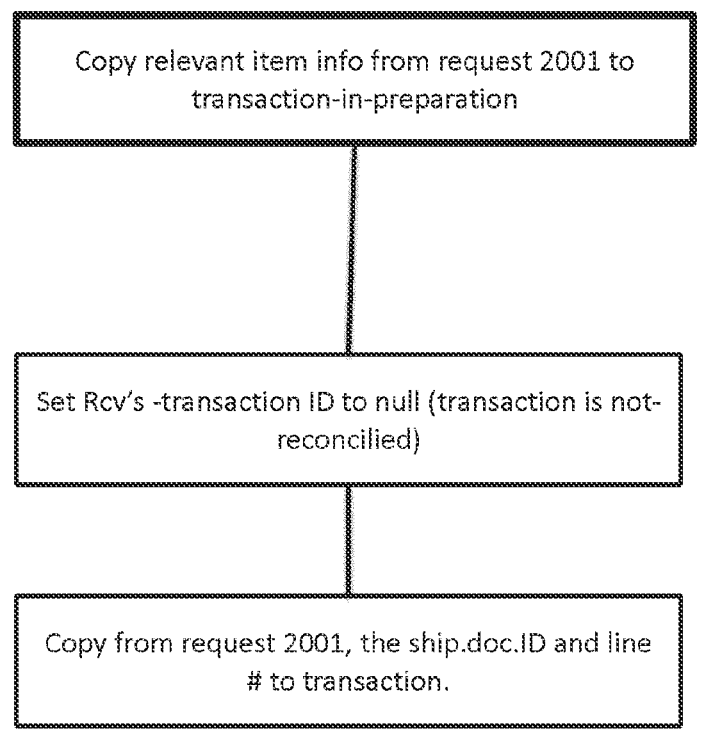
FIG. 11A (SHEET 11/21) is a diagram depicting an embodiment of the process for the Ship-Item Transaction Generation.
Figure 11B:
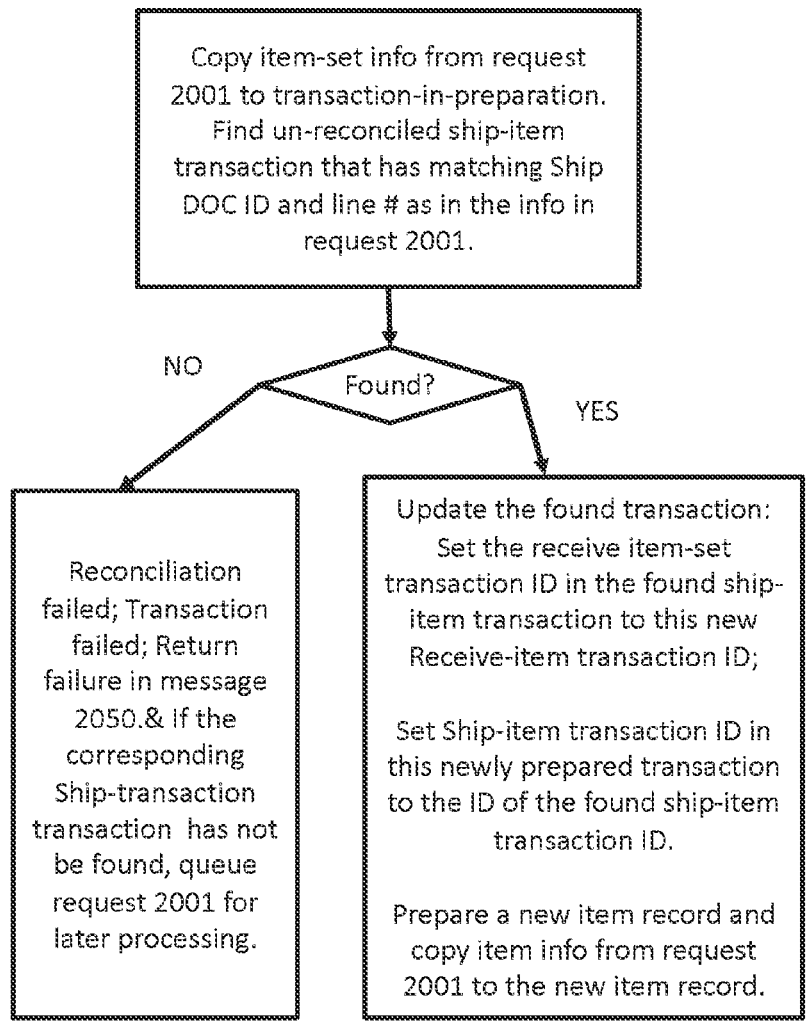
FIG. 11B (SHEET 12/21) is a diagram depicting an embodiment of the process for the Rcve-Item Transaction Generation.

Referring now to FIG. 11A and FIG. 11B, these transactions can be considered a transaction pair. For transaction pairs, the subsequent transaction may refer to information stored in the prior transaction when generating a transaction. Furthermore, during the generation of the subsequent transaction, information stored in the prior transaction may be updated or modified to reflect the status of the subsequent transaction.

For example, consider FIG. 11A and FIG. 11B, which is a ship-transaction and a receive-transaction pair. These transactions are generated when an item is shipped from a producer to a consumer, and when a consumer receives the item from the consumer.

Referring now to FIG. 11A, for a Ship-item type Transaction Processing 1050 invokes the Ship-item Transaction Generation process 270. The ship-item transaction generation process sets the field Receive-item PFTS transaction ID, of the new transaction, to unknown as the item is just being shipped and has not been received. Also recorded in the new transaction is the Document ID of the shipment document and the line number which identifies the item being shipped.

Referring now to FIG. 11B, for a Receive-item transaction type, then Transaction Processing 1050 invokes the process for Receive-item Transaction Generation 275. This process performs reconciliation. The receive item transaction type can also capture information that may be necessary to track the provenance of the item. This information includes, but is not limited to, the Shipping Manifest (Delivery Invoice) document ID and also the document line number on which the item appears. When PFTS receives this information about a reception of an item/supply that needs tracking, the PFTS correlates the shipment manifest ID, or a Delivery Invoice ID, (or other business document identifier containing the received item) with the shipment transaction information recorded by the PFTS as a shipment initiation transaction when the item was shipped. The correlation/matching of the received shipment to the shipment initiation transaction is done using the shipping document ID, which must match the shipment manifest ID, and the line numbers.

Examples of shipment documents include, but are not limited to, purchase orders (POs). It is a standard practice that when a company orders goods or services from its supplier, both the company and the supplier use the same document, such as a Purchase Order (PO), to describe items/supply that were ordered. A PO has information that describes the properties of the PO itself, such as the name and address of the supplier, date, and a unique PO number. Furthermore, it also has lines, wherein each line identifies information about an item/service ordered, such as identification, price, and quantity and/or weight. A copy of a purchase order is kept at least by the two companies, the company that issued the PO and the receiving supplier, which is a company from which the items/supply, which appear on the PO lines, have been ordered. Similarly, a Delivery Invoice document, or Shipping Manifest, has information that applies to the whole document, such as date, the names and address of the shipper and the receiver, and a unique Delivery Invoice number. It also has information about the items/goods/supply/services that are included in the shipment/delivery and the purchase order issued for their purchase; if items, which are in the shipment, were ordered by using more than one PO, for each item there is also a reference to the PO number and the line number, to identify the item order-information. It is understood that the documents, such as purchase orders or invoices, may be stored in digital form in various formats, such as PDF files or Universal Business Language (UBL), which is based on XML, files. Furthermore, in UBL or other business document standards, instead of lines and line numbers, the concepts of objects and object identifiers may be used to represent individual items/products on a document: For instance, instead of using lines and line numbers to describe an individual item being ordered, if on a PO, a UBL document uses the concept of an object describing the item and the object identifier being used as a line number to identify which item.

In the example depicted in FIG. 11B, the request contains the document ID and the line number of the receiving document. It searches through all Ship-item transactions that have yet to be reconciled. That is it searches Ship-item transactions in the blockchain 170 and/or datastore 180 for any transactions where the Receive-transaction-ID is not known. The transaction then attempts to match the shipment document ID and the line number (which was included in the previously recorded Ship-item transaction) in the blockchain 170 and/or datastore with the document ID and line number in the request 2001.

If such a transaction is found then:
1. The Ship-item transaction that matched is updated to include the Receive-item transaction ID that was assigned to the Receive-item transaction; and
2. Receive-item Transaction Generation 275 includes in the new transaction the PFTS transaction ID of the Ship-item transaction that matched in reconciliation process.

If such a transaction is not found, then the request 2001 for the transaction generation is queued for later processing (or temporarily paused) as the shipper may have been tardy with generating a Ship-item transaction. When the later processing happens can be determined by using a timer: When the transaction generation is queued (or temporarily paused), a timer is set and when the it expires the whole process of the transaction for the request 2001 transaction generation described in FIG. 9B is repeated. Or, instead of using the timer, the processing of the request 2001 may be triggered any time a new Ship-transaction is being generated or a set number of ship transactions has arrived. For instance, in an example embodiment receive-transaction reconciliation is performed for all receive-transactions for a company any time the PFTS receives a ship-transaction to the company.

In some instances an item-set may be received via a shipment from a supplier who is not a PFTS client. If the shipment is from a company that is not a PFTS client, then the PFTS has no information on provenance of the goods in the shipment except that it is from the company who shipped it. In such a situation, the PFTS registers an item by storing the transaction that includes a timestamp, supplier ID, detailed information about the item(s) received, the PFTS unique main-ID(s) assigned to the item(s), the ID used by the client company to identify the item, and any additional information that is required for provenance tracing. PFTS also augments data structures for efficient processing with information about the transaction. Furthermore, it also creates an item record containing the PFTS-item-ID, Company-item-ID, item-name, supplier ID and detailed information about the item(s) received, the type of measurement units used, and the measurement value, such as quantity, volume, or weight, as is appropriate for the item and indicated by measurement units type.

In some embodiments the PFTS 111 updates (reconciles) the shipping transaction to include the matching receiving transaction (that is, the receiving transaction ID is recorded). After the successful correlation of the received item document information (shipping manifest or Delivery Invoice) with the shipping document, the PFTS 111 records, in the shipping transaction, the ID of the receive transaction recorded by the receiving company. Similarly, in the shipping transaction, PFTS records the ID of the transaction ID for receiving that item.

In addition to looking after the transaction information, PFTS also creates a new record about the item and includes in it the newly assigned unique PFTS-item-ID, Company-item-ID and other information as already described above for the Receive-item transaction. The record is stored on the blockchain 170.

The Change and Receive custody transaction pair operates similarly to the ship and receive custody pair described in FIG. 11A and FIG. 11B. That is, the receive custody transaction must be reconciled with its corresponding change custody transaction.

If the request 2001 is for a Change-custody transaction type, then Transaction Processing 1050 invokes Change-Custody Transaction Generation process 265 shown in FIG.

12A, which sets the field Receive-custody-PFTS-transaction-ID, of the new transaction, to unknown as the item, for which custody is being changed, has not been as yet received by the company that is receiving the custody of the item.

Figure 12B:
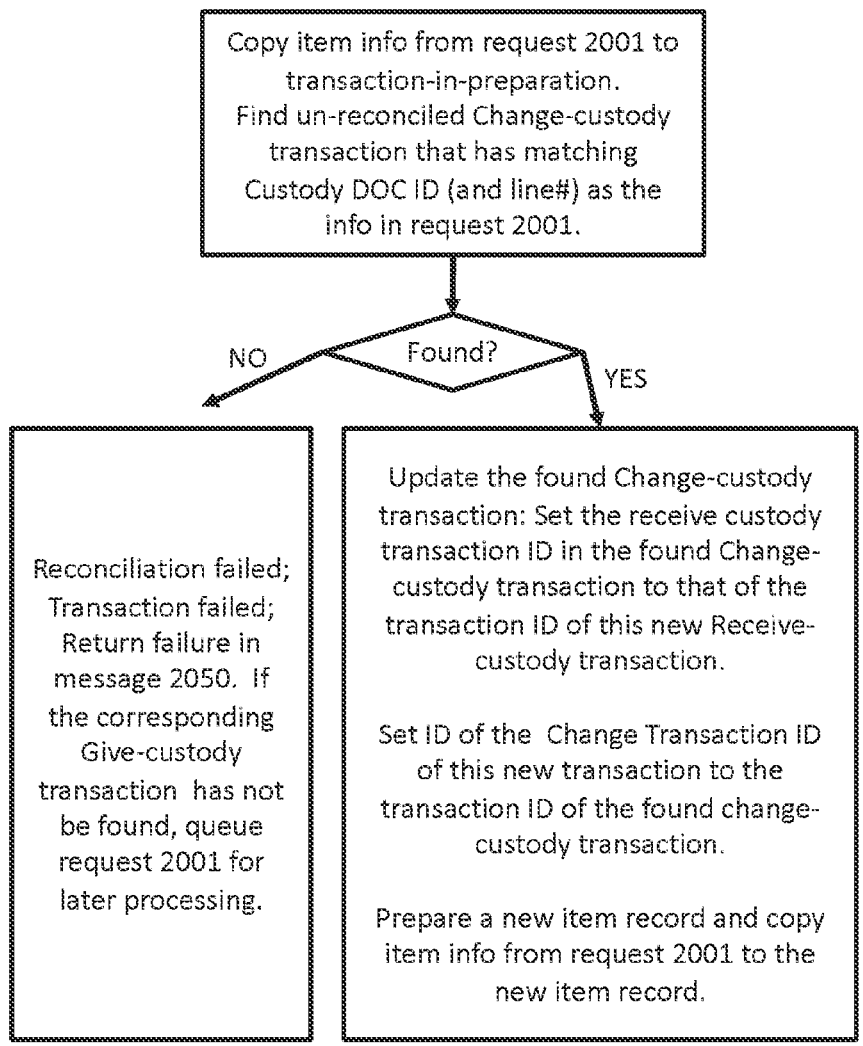
FIG. 12B (SHEET 14/21) is a diagram depicting an embodiment of the process for the Receive-Custody Transaction Generation FIG. 13A (SHEET 15/21) is a diagram depicting an embodiment of the process for the Give-Service Transaction Generation.

If the request 2001 is for a receive-custody transaction type, then Transaction Processing 1050 invokes the process for receive-custody Transaction Generation 267 in FIG. 12B. The Receive-custody Transaction Generation 266 includes in the new transaction the PFTS transaction ID of the Change-custody transaction that matched in the reconciliation process. The process depicted in FIG. 10B performs reconciliation. That is, it searches through all Change-custody transactions that have yet to be reconciled, i.e., it searches in the set of Change-custody transactions, for which Receive-custody transaction-ID is not known, for the one that has a custody document ID (and a line number if appropriate) matching the one included in the request 2001. If there is a match then the Change-custody transaction that matched is updated to include the Receive-custody transaction ID that was assigned to the newly created Receive-custody transaction.

The ES or a user via a web interface, of the item's owner or of the company that has the custody of set of items, informs the PFTS that the change of custody is being initiated for an item-set, while providing PFTS information on the item-set and the Give-custody document ID. The PFTS creates a Give-custody transaction that contains information about the item, the identity of the custody receiver, and a unique Give-custody document ID it creates. If the Give-custody document is used to initiate the change of custody of more than one set of items, then of which sets of items the custody is being changed is organized in lines, or its equivalent such as objects—in such a situation, in addition to the Give-custody document ID, also included is the line number that contains information about the item-set in question.

The receiver of custody, upon receiving a copy of the Change of Custody document, informs the PFTS about it while providing the PFTS with information on the item in question and the Change of Custody document ID. PFTS uses the Change of Custody document ID to correlate it with the Change of Custody document ID associated with the Give-custody transaction. PFTS records a Receive-custody transaction on the blockchain wherein the transaction includes a unique transaction ID created by the PFTS, the description of the item, ID of the item's owner and the Give-custody document ID. In addition, the PTFS also modifies the correlated Give-custody transaction, stored on the blockchain, to augment it with the ID of the Receive-custody transaction just recorded by PFTS.

In addition, the PFTS also creates a new record about the item-set and includes in it the newly assigned PFTS main-ID, ID assigned by the company to the item-set, and other information as already described above for the Receive-item transaction. The record is stored on the blockchain.

Figure 13B:
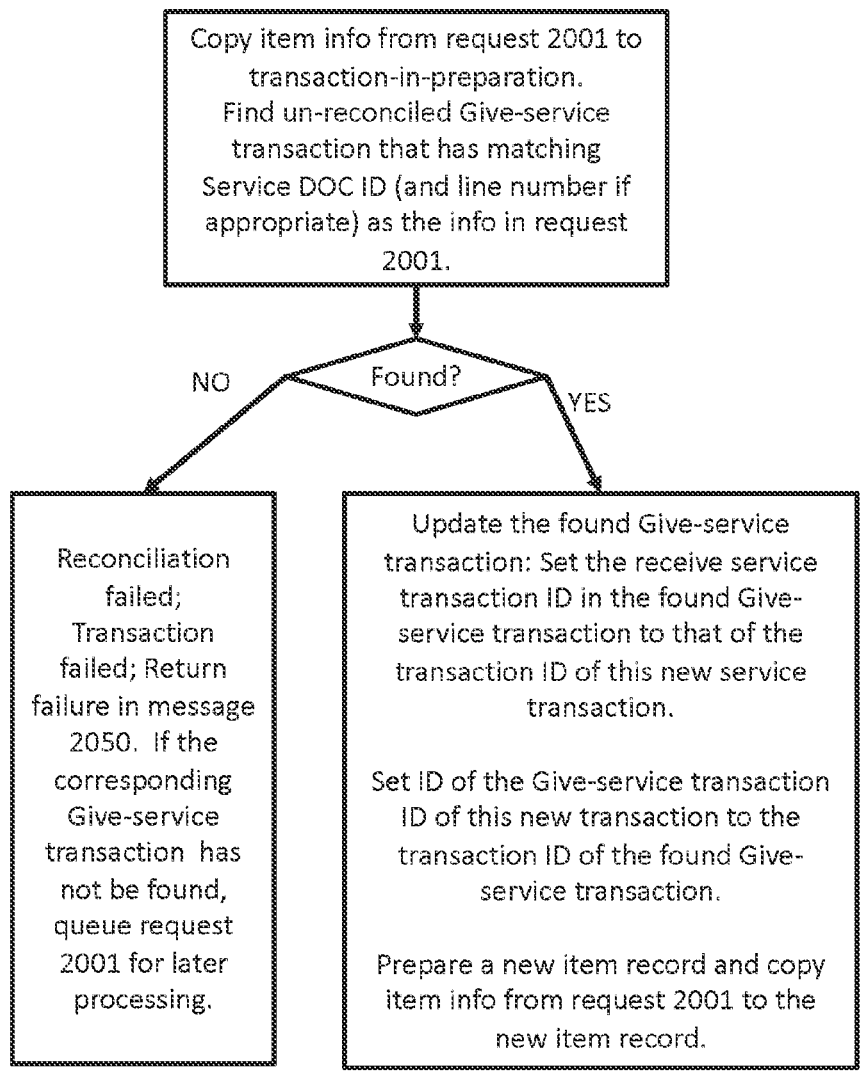
FIG. 13B (SHEET 16/21) is a diagram depicting an embodiment of the process for the Receive-Service Transaction Generation.

As depicted in FIG. 13A and FIG. 13B, another example of a paired transaction is the give and receive service transaction pair. Similar to the earlier described paired transaction, the receive-service transaction is paired with a give-service transaction that must eventually be reconciled.

If the request 2001 is for a Give-service transaction type, then Transaction Processing 1050 invokes the process for Give-service Transaction Generation 285 and if the request 2001 is for a Receive-service transaction type, then Transaction Processing 1050 invokes the process for Receive-service Transaction Generation 287. FIG. 13A and FIG. 13B show the Give-service and Receive-service transaction service generation, respectively.

Figure 14:
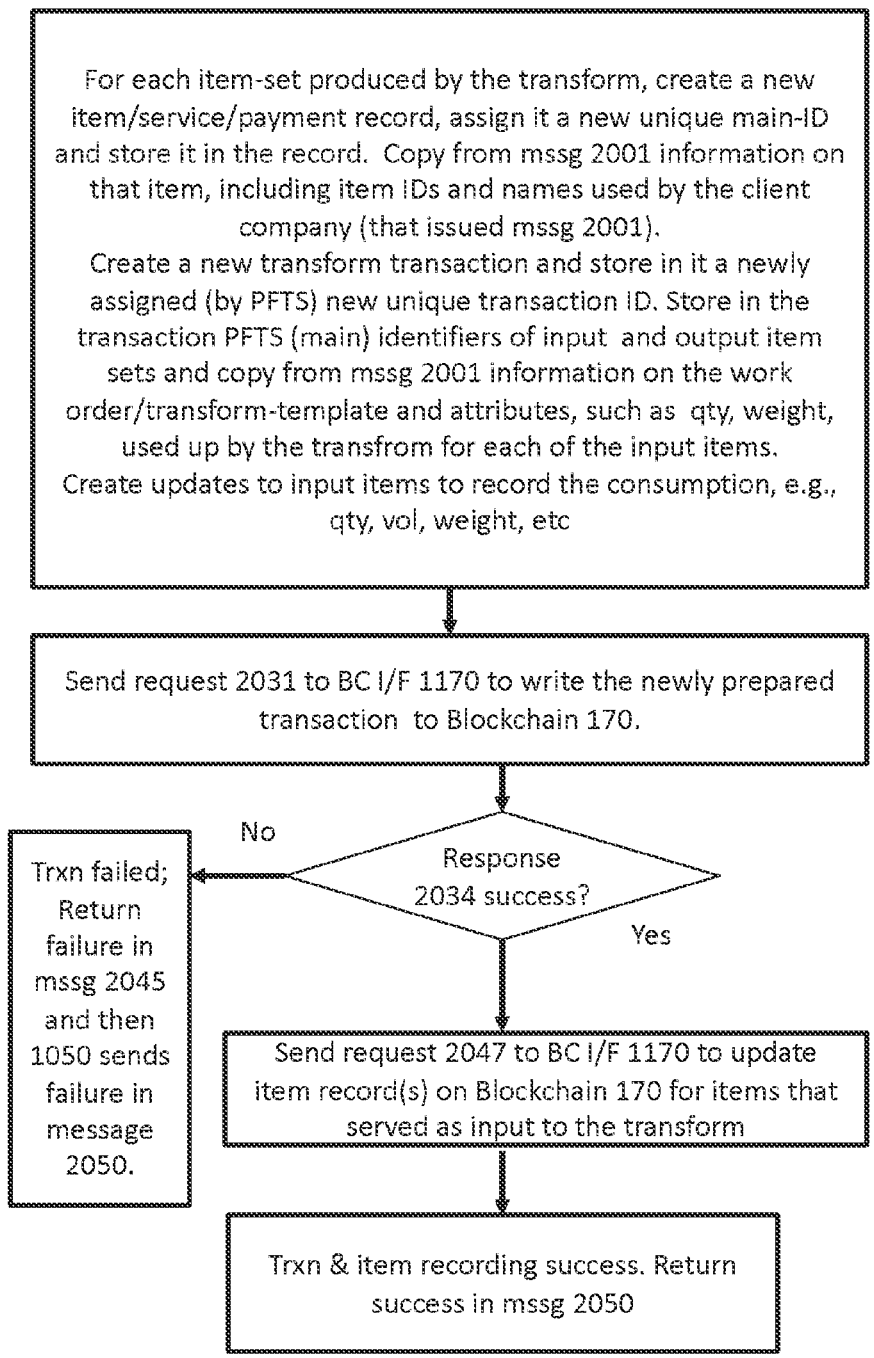
FIG. 14 (SHEET 17/21) is a diagram depicting an embodiment of the process for the Transform Transaction Generation.

If the request 2001 is for the Transform transaction type, then Transaction Processing 1050 invokes Transform Transaction Generation process 280 shown in FIG. 14, which records in the new transaction the type of the Transform, which is one of 1-to-1, 1-to-many, many-to-1, or many-to-many, or many-to-zero, and copies, from the request 2001 into the new transaction, information about the items input into the transform and information about the items produced by the transform. The content of the request message 2001 has been described above. If the transform is not of the type many-to-zero, it also creates new item records, one for each item created by the transform, assigns each one a new PFTS ID and other details copied from the request message 2001 and also prepares updates for records of items that served as input to the transform. It then sends a request 2031 to the Blockchain Interface 1180 to write the transaction and the new item records on the blockchain 170. Once that is done, it also send a request message 2047 to the Blockchain Interface 1170 to update item records on the Blockchain 170 for those items that served as input to the transform.

If the transform is of type many-to-zero, the processing is as above, but as a new item is not generated, but the modified item-set attributes may be modified, for instance the weight may be updated to account for installation of an optional part that may have been added by the MIZO transform.

Figure 15:
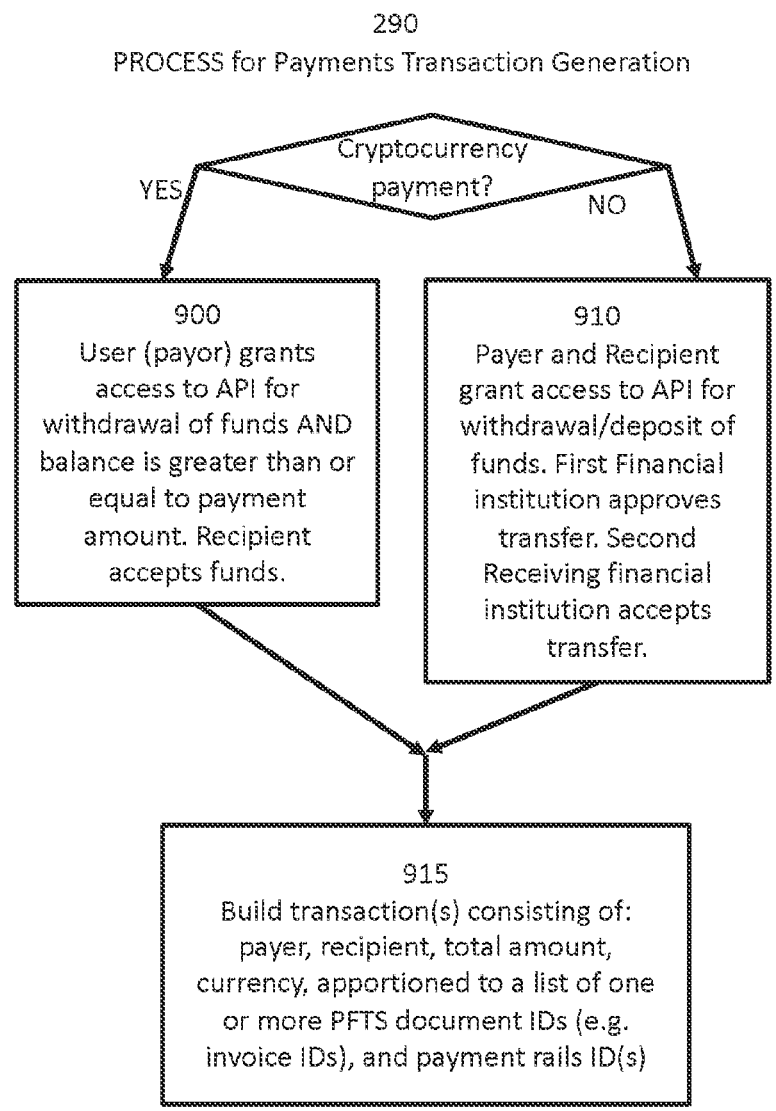
FIG. 15 (SHEET 18/21) is a diagram depicting an embodiment of the process for the Payments Transaction Generation.

FIG. 15 depicts one embodiment of the process 290 to prepare or generate a payment transaction before it gets issued to the blockchain. A payment can be made either with cryptographic currency only, fiat currency only, or a mixture of cryptographic and fiat currency.

Any part of the payment that is made by cryptographic currency first passes through sub-process 900. Then the payer and recipient provide information on the payer, recipient, total amount of the payment, currency, and a breakdown of payment to one or more invoices. The identification of the payment rails (e.g. Bitcoin, Ethereum, Zcash, or other) that are used to execute the transfer are also provided and recorded. These data (payer ID, recipient ID, payment amount currency, breakdown, and rails ID(s)) are then placed in one or more pay transactions (915) and stored in auxiliary data stores 180 and blockchain 170.

Similarly, any part of the payment that is to be made with fiat currency goes through sub-process 910. In one embodiment the payer and recipient grant the PFTS access to his/her/its account at another financial platform or institution, which may include a bank, loan provider, or online financial service, via an API. The PFTS takes the payment funds from the payer and assign them to the recipient company or person's account, which may be a fiat currency account or a cryptographic currency account.

In another embodiment, the payer and recipient provide the PFTS information on the first and second financial institutions/services that execute the payment, and hence transfer of funds.

Figure 16:
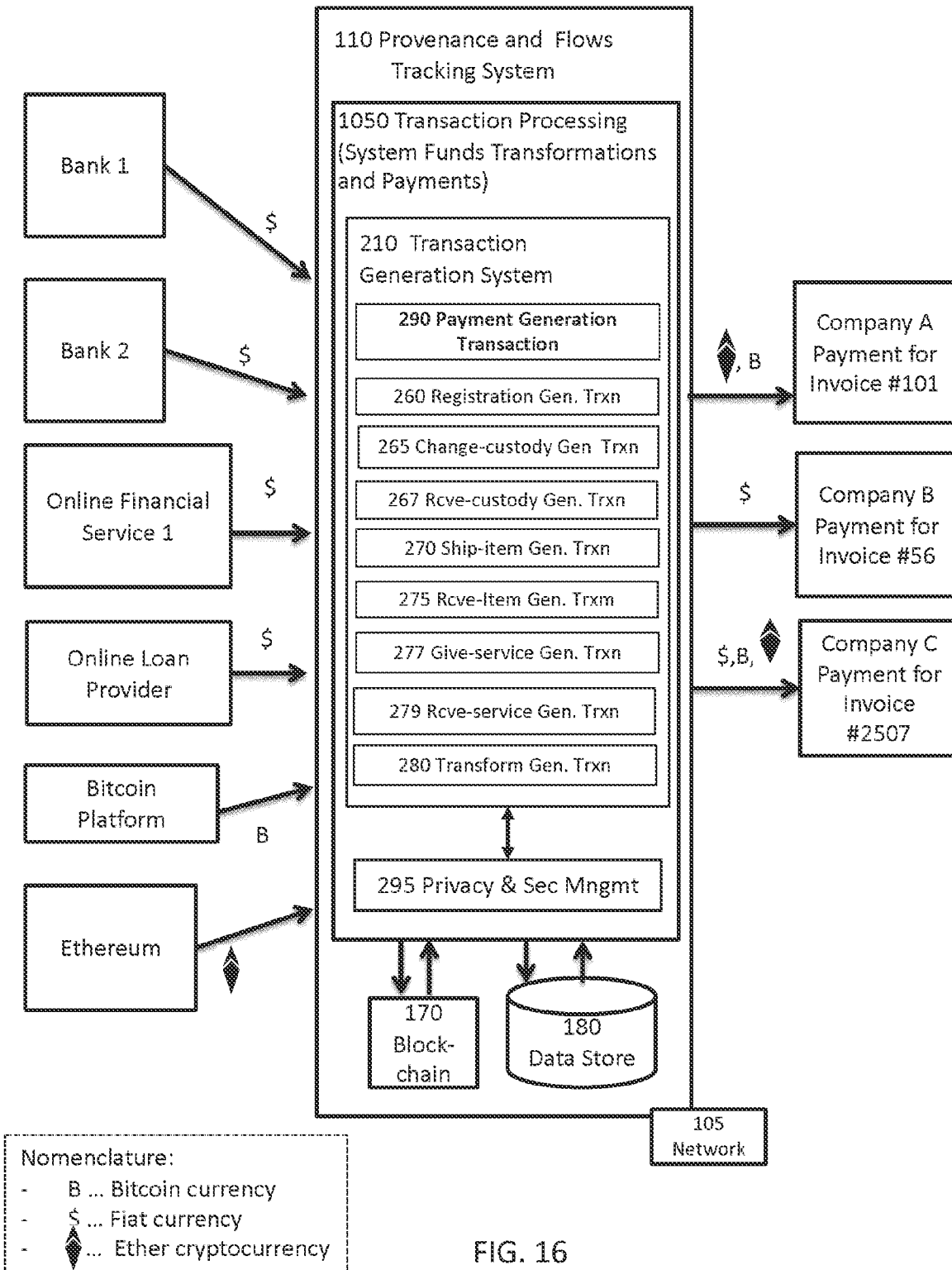
FIG. 16 (SHEET 19/21) is a diagram depicting an embodiment of a transformation transaction for payments where the transaction can aggregate and process funding inputs from accounts in different currencies including cryptographic currencies, and parcel the result out to pay various invoices in one or more fiat and/or cryptographic currencies.

Referring now to FIG. 16, a block diagram is provided that illustrates an example of how a payment generation transaction 290 is processed. In this example, there can be a single funding source input-single payment output (SISO); in another embodiment, there can be multiple fund sources as inputs, and one payment as output (MISO); in a further embodiment there can be a single-account source of funds as input to the Transformation transaction and multiple payments as output (SIMO); in another embodiment (e.g. FIG. 18), there are multiple sources of funds as input and multiple payments (outputs) from the transform transaction (MIMO). The figure illustrates inputs and outputs for the Payment Generation transaction (290) for the first receiving of funds from various sources and in various currencies, including cryptographic currencies, second receiving instructions for their transformations, and assignments for payments to zero or more invoices, and executing the transformations within the transaction generation system 210, optionally adding privacy preservation, and issuing the associated transactions for record, clearing, reconciliation, and payment settling on the blockchains 170 and data stores 180. It should be noted that payment settling can happen off-blockchain but that a record of the off-blockchain payments are also kept on the blockchain. FIG. 16, also illustrates how combinations of the transactions defined herein, such as the Receive-item, Transform and Payment combinations, can be put to use for aggregating sources of funds from multiple cryptographic and fiat currency accounts and distributing them to multiple companies to settle bills associated with sourcing goods and services. The transactions herein on the blockchain enable tracking payments flows which are verifiably tied to specific movements of goods and services.

The Privacy and Security Management system 295 of the Transaction Processing System 1050 enables invocation of privacy and security services. That is, it modifies the transaction generated by the transaction generation system 210 so that they are private and secure. In some embodiments the services are based on the Fair Information Processing Principles that include, but are not limited to privacy enforcement, agreement, authorization, authentication, certification, data minimization, de-identification, pseudonymization, validation, unobservability, unlinkability of personally identifying data, encryption, obtaining explicit and informed consent, access control to sensitive data passed on purpose, controlling data usage based on purpose and authorization, maintaining privacy audit trails, privacy negotiation, and maintaining versions of privacy policies.

The privacy and security management system 295 delinks/anonymizes Personally Identifiable Information (PII) from the provenance transaction data and can also encrypt provenance transaction data. As an example, in some embodiments the provenance transaction data includes PII that is modified by the privacy and security management system 295 to provide de-identification. For example, in some instances PII is replaced by some linking information or coding that provides a reference to where the PII is stored (for instance, in the secure data store 180).

Furthermore, in some embodiments the privacy and security management system 195 encrypts the provenance transaction data that is stored on the blockchain 170 so that only users authorized to decrypt the provenance transaction can do so. For instance, only users possessing the appropriate decryption key can decrypt provenance transactions stored on the blockchain 170.

As part of ensuring non-repudiation, confidentiality, integrity, and assurance properties, cryptographic signing is used by various actors in a blockchain system. For instance, a company's user, or a service on behalf of a user, signs with her private key to give up ownership or custody or to signal a transform or shipping event. A corresponding company signs to receive ownership, custody, or confirm the completion of a transform or shipping event. The privacy and security system ensure that PFTS transfer processes (e.g. ship and change custody) contain the first user or company signing, followed by the receiving company's user or agent signing with their private keys. In addition, layers of cryptographic signing are found in blockchain consensus protocols in the state-of-the-art for additional transaction security.

Figure 17:
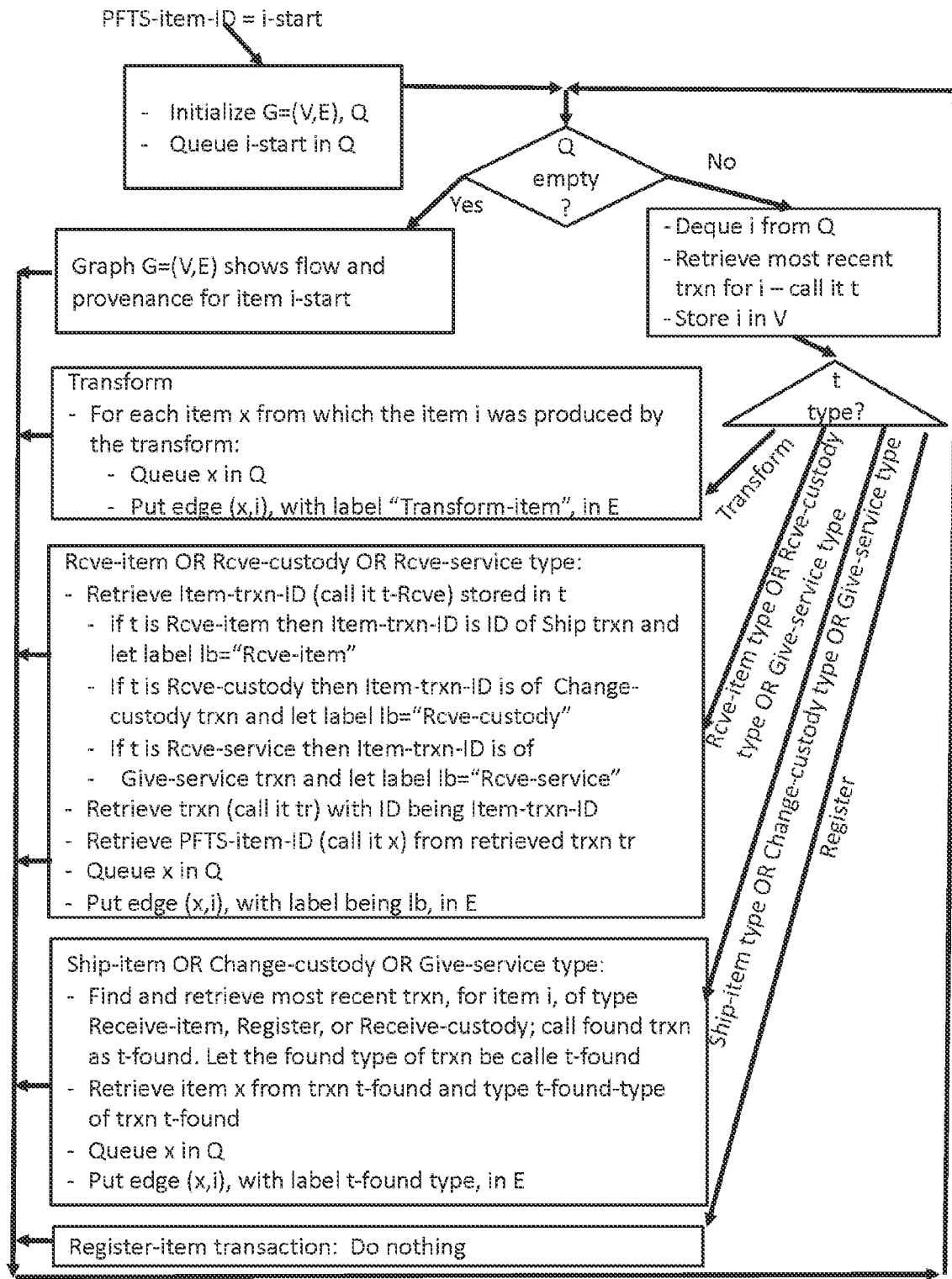
FIG. 17 (SHEET 20/21) is a diagram depicting a sequence of steps to produce a provenance and a flow of items/services in producing a given item/service.
Figure 18:
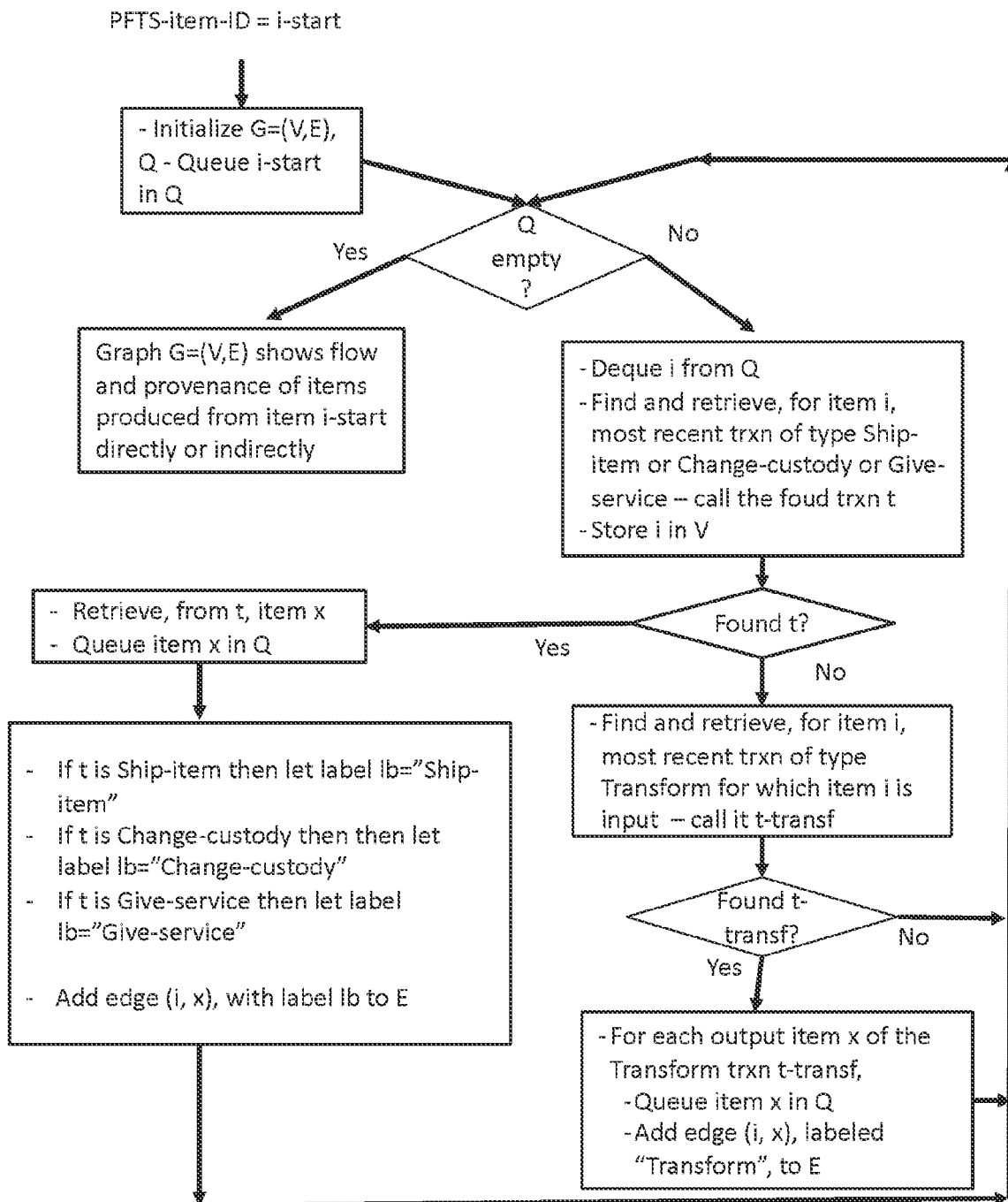
FIG. 18 (SHEET 21/21) is a diagram depicting a sequence of steps to produce a provenance and a flow of all items/service in which a given item/service is used directly/indirectly in their production.

Referring now to FIG. 17 and FIG. 18, the Admin and reporting system 1020 is used to generate a provenance and flow of items having a specific PFTS item id. FIG. 16 shows a sequence of steps of a method, executed by the Admin and reporting system 1020, to show for an item with a given PFTS-item-ID, a report on the provenance and flow of items from which the given item was produced. In the figure, a statement "retrieve t-ship", where t-ship is the transaction ID, means that a transaction with the Trxn-ID being t-ship is retrieved. Also, recall that a Receive-item transaction has a field Ship-trxn-ID that contains the ID of the shipment transaction for the item that was received as described by the Receive-item transaction. Similarly, a Ship-item transaction contains a field Receive-trxn-ID that contains the ID of the transaction that received the item that was shipped as described by the Ship-item transaction.

The 1020 Admin & Reporting system allows the Admin user 115 to search through the transactions and/or item-sets that satisfy search criteria or to find provenance information for a given item either up or down the supply chain. To find the required information for the specific search or the provenance trace, it uses the Search and Provenance Graph system 1056. The Admin and Reporting System 1020 provides the interface to the Search and Provenance Graph system 1056 to ensure that only privileged users have access to search and provenance functionality.

Once the information is retrieved by the Search and Provenance System 1056 the Admin & Reporting System 1020 filters the retrieved information to ensure that only information to which the user has access is returned to the user. As an example, if the Admin user belongs to one of the companies participating in the PFTS system and has only access to information of his/her company, then The Admin & Reporting system 1020 will filter any information that is not relevant to that company. In contrast, a privileged user such as an auditor will be able to access all information retrieved from the Search and Provenance Graph System 1056.

The Search and Provenance graph system 1056 is used to search through the transactions and/or item-sets that satisfy search criteria, such as find all item-sets shipped by a certain company in specific period of time or find transactions pertaining to a specific item sets and in a specific period of time. It can also be used to produce reports on specific items or reports on items for a specific company. To perform the search, it uses the data structures built and managed by 1180.

The Search and Provenance system 1056 may also be used to find provenance information, up the supply-chain stream, for a specific item/product/service. For that purpose, the system uses a method of FIG. 17 that finds all items/ services used in the production of that item by finding all transactions related to that item and used in its production. The method represents the provenance as a graph and uses transaction, and how they relate to each other, to build it. Once the items forming the trace are found, the admin user may ask for information either in a form of a graph or in a textual manner in a form of a report.

The Search and Provenance System 1056 may also be used to find, for a given item/supply/service, in which other items/products/services it was used, i.e., it can find a trace down the supply chain.

For example, consider the transaction with the PFTS ID being 140 and assume that it was the most recent transaction recorded for the item with the PFTS ID being 340. For this item, the method would first find the most recent transaction, which is the transaction with the PFTS transaction ID being 140. From that transform transaction, the method determines that the item 340 was made from items 316 and 305. The method then determines that the item 305 was produced by a transform form items with PFTS IDs 301 and 302. Then, the method determines that the item 316 was received as described by the PFTS transaction 130 and that the shipment transaction was 120. Examining the shipment transaction 120, the method determines that the item that was shipped was with the PFTS ID 316 and then retrieves the transform transaction with PFTS transaction ID being 114, and that the item was produced from the item with the PFTS ID 306. The method then finds the Register-item transaction 102 and discovers the last item, item with the PFTS ID 302, that was used to produce the given item with the PFTS ID 340.

For a given good/service/payment as identified by a given PFTS ID, find the most recent transaction(s) that describe the receiving of the good/service/payment, if it was received, or describes the production of the good/service/payment, identified by the PFTS ID, if it were produced by a transformation from other goods/services/sources of funds.

Given a client-company ID and the item ID/number it uses to identify the good/service/payment, the data structure is used to find the PFTS unique ID as used by PFTS to identify it.

Given a transaction that describes the reception of a good, service, or payment, information contained in that transaction is used to find/determine the shipment/provision/making transaction of the said good/service/payment and hence also the PFTS IDs of the good/service.

FIG. 17 shows a sequence of steps of a method, executed by the Admin 1020, to determine in which other products was an item, with a given PFTS item ID, used as a direct or indirect input to the transforms producing those products. This method is suitable, for instance, in situations wherein a defective item was used in production of other items that need to be recalled because the defective item was used in their production.

The methods shown in FIG. 17 and FIG. 18 use PFTS transactions to create graphs that represent the provenance of an item/service/payment. The methods create a directed graph that represents the provenance of an item; recall that an item is one of good/supply/service/payment. Each node in the graph represents an item-set. For a graph node X, representing an item-set x, incoming edges for a node represent items used in the production of the item x, while outgoing edges from the graph node X represent in which other items is the item x being used as a supply (in the production of those items). For instance, if there is an edge from graph node X (representing item x) to graph node Y (representing item y), then the item x was used in the production of item y.

The methods in FIG. 17 and FIG. 18 represent full provenance. Such a graph may be produced by Admin operator and disclosed to authorities if the Admin is compelled to do so, for instance by a warrant. However, if one company would like to see a provenance graph, it may not see information, including PFTS transactions, obtained from companies that do not agree to share their provenance information. In such a case, partial provenance graph is produced showing only information (PFTS transactions) from those companies that have agreed to share their information. This is achieved by first producing the full provenance information and then suppressing information on the graph that was obtained from the companies that do not agree to share their information with other companies.

Storing the described PFTS transactions to the blockchain can take multiple forms depending on the consensus mechanism used within any particular blockchain. These PFTS transactions form a payload that can be managed by smart contracts, which generate and manage native blockchain transactions in a variety of embodiments. The first embodiment is the PFTS transaction payload as external input to a smart contract.

Another embodiment is the generation of the PFTS transaction payloads under the governance of smart contracts.

A third embodiment is a thicker smart contract first coordinating the input from enterprise systems into the PFTS transactions, and then translating payloads to native blockchain transactions while managing state and ledger updates.

Additional Description

The following clauses are offered as further description of the examples of the systems and methods described herein. Any one or more of the following clauses may be combinable with any other one or more of the following clauses and/or with any subsection or a portion or portions of any other clause and/or combination and permutation of clauses. Any one of the following clauses may stand on its own merit without having to be combined with any other clause or with any portion of any other clause, etc. Clause (1): A provenance and flow tracking system (either taken alone, or with a system of any clause mentioned in this paragraph, or any portion of any clause mentioned in this paragraph) comprising: a transaction processing system 1050 for generating and recording a provenance transaction that includes information to track the provenance of an item, service, transformation, and/or payment; a blockchain interface 1170 for facilitating communication with a blockchain, the blockchain interface 1170 configured to store the provenance transaction on the blockchain and to retrieve the provenance transaction from the blockchain; and a search and provenance graph system 1056 for generating a directed graph to represent the provenance of an item/service/payment using the provenance transaction stored on the blockchain. Clause (2): A provenance and flow tracking system (either taken alone, or with a system of any clause mentioned in this paragraph, or any portion of any clause mentioned in this paragraph) further comprising: a data store interface 1180 for communicating with a secure datastore 180, the secure data store 180 configured to store ancillary data to the provenance transaction for efficient processing. Clause (3): A provenance and flow tracking system (either taken alone, or with a system of any clause mentioned in this paragraph, or any portion of any clause mentioned in this paragraph) further comprising: a document system 1053 for storing, managing, and retrieving documents associated with the provenance transaction, the document system 1053 interfacing with the secure datastore 180 through the datastore interface 1181. Clause (4): A provenance and flow tracking system (either taken alone, or with a system of any clause mentioned in this paragraph, or any portion of any clause mentioned in this paragraph) further comprising: an applications programming interface (API) for interfacing with any one or a combination of client enterprise systems 121-131, third-party APIs, and blockchain APIs. Clause (5): A provenance and flow tracking system (either taken alone, or with a system of any clause mentioned in this paragraph, or any portion of any clause mentioned in this paragraph) wherein the transaction processing system 1050 further comprises: a transaction preparation subsystem 210 for generating provenance transactions for storage on the blockchain. Clause (6): A provenance and flow tracking system (either taken alone, or with a system of any clause mentioned in this paragraph, or any portion of any clause mentioned in this paragraph) wherein the transaction processing system 1050 further comprises: a privacy and security management system 295 for applying privacy-keeping protocols to the provenance transactions generated by the privacy & transaction preparation system 210. Clause (7): A provenance and flow tracking system (either taken alone, or with a system of any clause mentioned in this paragraph, or any portion of any clause mentioned in this paragraph) further comprising: a client user UI for client users to interact with the provenance and flows tracking system 110. Clause (8): A provenance and flow tracking system (either taken alone, or with a system of any clause mentioned in this paragraph, or any portion of any clause mentioned in this paragraph) further comprising: an admin user UI 115 for administrators to interact with the provenance and flows tracking system 110. Clause (9): A provenance and flow tracking system (either taken alone, or with a system of any clause mentioned in this paragraph, or any portion of any clause mentioned in this paragraph) wherein the transaction preparation subsystem 210 is configured to generate a registration transaction 260. Clause (10): A provenance and flow tracking system (either taken alone, or with a system of any clause mentioned in this paragraph, or any portion of any clause mentioned in this paragraph) wherein the transaction preparation subsystem 210 is configured to generate a ship item transaction 270 and a receive item transaction 275 and reconcile the receive item transaction 275 with the ship item transaction once the receive item transaction 275 is processed. Clause (11): A provenance and flow tracking system (either taken alone, or with a system of any clause mentioned in this paragraph, or any portion of any clause mentioned in this paragraph) wherein the processing of the receive item transaction 275 is temporarily paused if a corresponding ship item transaction 270 is not found on the blockchain. Clause (12): A provenance and flow tracking system (either taken alone, or with a system of any clause mentioned in this paragraph, or any portion of any clause mentioned in this paragraph) wherein the transaction preparation subsystem 210 is configured to generate a change custody transaction 265 and a receive custody transaction 267 and reconcile the receive custody transaction 267 with the change custody transaction 265 once the receive custody transaction 267 is processed. Clause (13): A provenance and flow tracking system (either taken alone, or with a system of any clause mentioned in this paragraph, or any portion of any clause mentioned in this paragraph) wherein the processing of the receive custody transaction 267 is temporarily paused if a corresponding change custody transaction 265 is not found on the blockchain. Clause (14): A provenance and flow tracking system (either taken alone, or with a system of any clause mentioned in this paragraph, or any portion of any clause mentioned in this paragraph) wherein the transaction preparation subsystem 210 is configured to generate a give service transaction 277 and a receive service transaction 279 and reconcile the receive service transaction 279 with the give service transaction 277 once the receive service transaction 267 is processed. Clause (15): A provenance and flow tracking system (either taken alone, or with a system of any clause mentioned in this paragraph, or any portion of any clause mentioned in this paragraph) wherein the processing of the receive service transaction 279 is temporarily paused if a corresponding give service transaction 277 is not found on the blockchain. Clause (16): A provenance and flow tracking system (either taken alone, or with a system of any clause mentioned in this paragraph, or any portion of any clause mentioned in this paragraph) wherein the transaction preparation subsystem 210 is configured to generate a transform transaction 280 that records the transformation of the item from one form to another. Clause (17): A provenance and flow tracking system (either taken alone, or with a system of any clause mentioned in this paragraph, or any portion of any clause mentioned in this paragraph) wherein the transform transaction 280 is any one of a single-input single-output, single-input multiple output, multiple-input single-output, multiple-input multiple-output, or multiple-input zero-output transform transaction. Clause (18): A provenance and flow tracking system (either taken alone, or with a system of any clause mentioned in this paragraph, or any portion of any clause mentioned in this paragraph) wherein the transaction preparation subsystem 210 is configured to generate a payment transaction 290. Clause (19): A provenance and flow tracking system (either taken alone, or with a system of any clause mentioned in this paragraph, or any portion of any clause mentioned in this paragraph) wherein the search and provenance graph system 1056 is configured to search for a specific provenance transaction on the blockchain. Clause (20): A provenance and flow tracking system (either taken alone, or with a system of any clause mentioned in this paragraph, or any portion of any clause mentioned in this paragraph) wherein the search and provenance graph system 1056 is configured to determine the provenance of an item, service, or payment by searching for all provenances transactions on the blockchain for that item, service, or payment and generating a graph that represents the provenance of the item, service, or payment. Clause (21): A method for tracking the provenance of an item system (either taken alone, or with a system of any clause mentioned in this paragraph, or any portion of any clause mentioned in this paragraph) comprising: receiving a provenance transaction request from a user of a client ES 121; authenticating the user of the client ES 121 on an identity system 190; generating the provenance transaction for an item on the provenance and flows tracking system 110 once the user of the client ES 121 has been authenticated; and storing the provenance transaction on a blockchain through a blockchain interface 1170; wherein the provenance transaction is a generate transaction, a ship item transaction, a receive item transaction corresponding to the ship item transaction, a give service transaction, a receive service transaction corresponding to the give service transaction, a transform transaction, or a payment transaction. Clause (22): A method for tracking the provenance of an item system (either taken alone, or with a system of any clause mentioned in this paragraph, or any portion of any clause mentioned in this paragraph) further comprising: storing ancillary data of the provenance transaction on a secure data store 180 through a data store interface 1180 of the provenance and flows tracking system 110. Clause (23): A method for tracking the provenance of an item system (either taken alone, or with a system of any clause mentioned in this paragraph, or any portion of any clause mentioned in this paragraph) further comprising: storing a document associated with the provenance transaction on the secure datastore 180 through a document system 1053. Clause (24): A method for tracking the provenance of an item system (either taken alone, or with a system of any clause mentioned in this paragraph, or any portion of any clause mentioned in this paragraph) further comprising: determining the provenance of the item by: retrieving provenance transactions associated with the item from the blockchain via the blockchain interface 1170; generating a graph of the provenance transactions retrieved from the blockchain so that the retrieved provenance transactions are represented in the graph. Clause (25): A method for tracking the provenance of an item system (either taken alone, or with a system of any clause mentioned in this paragraph, or any portion of any clause mentioned in this paragraph) wherein the corresponding send item transaction is updated with the receive item transaction once the receive item transaction is received so that the receive item transaction is reconciled with the send item transaction. Clause (26): A method for tracking the provenance of an item system (either taken alone, or with a system of any clause mentioned in this paragraph, or any portion of any clause mentioned in this paragraph) wherein the receive item transaction reconciliation with the send item reconciliation is temporarily paused if the send item transaction is not found on the blockchain. Clause (27): A method for tracking the provenance of an item system (either taken alone, or with a system of any clause mentioned in this paragraph, or any portion of any clause mentioned in this paragraph) wherein the corresponding give service transaction is updated with the receive service transaction once the receive service transaction is received so that the receive service transaction is reconciled with the receive service transaction. Clause (28): A method for tracking the provenance of an item system (either taken alone, or with a system of any clause mentioned in this paragraph, or any portion of any clause mentioned in this paragraph) wherein the receive service transaction reconciliation with the send service reconciliation is temporarily paused if the send service transaction is not found on the blockchain.

It will be appreciated that the examples as described above may be implemented on a computer, such as a general purpose computer or a laptop; a specialized computer having application specific integrated circuits (i.e., ASIC); a smart device, which could be mobile, such as a smart entertainment center, virtual assistant, mobile phone or tablet. The computer, laptop, specialized computer, or a smart device may include a processing unit having one or more processors and a non-transitory computer-readable storage medium that may include, for example, volatile and/or non-volatile memory.

The memory may store one or more instructions to program the processing unit to perform any of the functions described herein. The computer may also include other types of non-transitory computer-readable medium, such as storage (e.g., one or more disk drives, solid state drives, flash memory) in addition to the system memory. The storage may also store one or more application programs and/or external components used by application programs (e.g., software libraries, operating systems, etc.), which may be loaded into the memory.

The computer may have one or more input devices and/or output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. The input devices may include a microphone for capturing audio signals or a video camera for capturing video signals. The output devices may include a display screen for visually rendering, and/or a speaker for audibly rendering, recognized text.

The computer may also comprise one or more network interfaces to enable communication via various networks. Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

This written description uses examples to disclose the invention and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A method for tracking a provenance of an item comprising:
   receiving, at a provenance and flow tracking system (PTFS) operating on a computing platform, a first provenance transaction request from a first client enterprise system (ES) to track a provenance of an item-set and a transaction type;
   authenticating, by an identity system, a first account employed on the first client ES;
   generating, by the PTFS, the first provenance transaction for the item-set responsive to authentication of the first account employed on the first client ES, wherein the first provenance transaction includes a transaction identifier (ID) that identifies the first provenance transaction;
   storing, by the PTFS, the first provenance transaction on a blockchain through a blockchain interface;
   wherein the first provenance transaction is a transform transaction, ship item transaction, a change custody transaction, a give ownership transaction, or a give service transaction;
   receiving, at the PTFS, a second provenance transaction request from a second client ES to track a provenance of the item-set and a transaction type, wherein the second provenance transaction is a receive item transaction, transform transaction, a receive ownership transaction, a receive custody transaction or a receive service transaction;
   authenticating, by the identity system, a second account employed on the second client ES;
   generating, by the PTFS, the second provenance transaction for the item-set responsive to authentication of user of the second account employed on the second ES, the second provenance transaction including a transaction ID of the second provenance transaction;
   storing, by the PTFS, the second provenance transaction on the blockchain through the blockchain interface;
   reconciling, by the PTFS, the first provenance transaction in response to storing the second provenance transaction, wherein the reconciling comprises:
     attempting to identify the first provenance transaction; and
     updating the first provenance transaction on the blockchain through the blockchain interface to include the transaction ID of the second provenance transaction in response to identifying the first provenance transaction.

2. The method of claim 1, further comprising:
   storing, by the PTFS, ancillary data of the first and/or second provenance transaction on a secure datastore through a datastore interface of the PTFS.

3. The method of claim 2, further comprising:
   storing, by the PTFS, a document associated with the first and/or second provenance transaction on the secure datastore through a document system.

4. The method of claim 1, further comprising:
determining, by the PTFS, the provenance of the item-set by:
retrieving provenance transactions associated with the item from the blockchain via the blockchain interface, wherein the provenance transactions retrieved from the blockchain include the first provenance transaction and the second provenance transaction; and
generating, by a search and provenance graph system, a representation of the provenance transactions retrieved from the blockchain so that the retrieved provenance transactions are represented in time order.

5. The method of claim 1, wherein the reconciling further comprises inhibiting the updating of the first provenance transaction responsive to the attempting to identify the first provenance transaction of the reconciling failing to identify the first provenance transaction in the blockchain.

6. The method of claim 1, wherein the attempting to identify the first provenance transaction of the reconciling further comprises:
searching the datastore and/or blockchain for a set of unreconciled provenance transactions;
searching documents associated with the set of unreconciled provenance transactions for a document ID included in the second provenance transaction request; and
selecting a given unreconciled provenance transaction of the set of unreconciled provenance transactions as the first provenance transaction responsive to matching the document ID included in the second provenance transaction request with a document associated with the given unreconciled provenance transaction.

7. The method of claim 6, wherein the document ID is a purchase order ID.

8. The method of claim 1, wherein:
the first provenance transaction request includes a digital signature of a first custodian indicating that the first custodian had custody of the item-set; and
the second provenance transaction request includes a digital signature of a second custodian and a timestamp indicating that the second custodian received the item-set from the first custodian at a time identified in the timestamp.

9. The method of claim 1, wherein the PTFS receives a request provided through a third client ES for transactions of an item of the item-set, and responsive to the request, the PTFS:
determines, based on a company identifier included in the request, information related to the transaction of the item identified in the request;
suppresses, based on the company identifier included in the request, unauthorized information related to the transaction to form authorization information for the request; and
communicates the authorized information to the third client ES.

10. The method of claim 1, wherein the reconciling further comprises recording discrepancies in recorded attributes of the item-set in the first provenance transaction and second provenance transactions.

11. A method for tracking a provenance of an item comprising:
receiving, at a provenance and flow tracking system (PTFS) operating on a computing platform, a subsequent provenance transaction request of a transaction pair from a client enterprise system (ES) to track a provenance of an item-set and a transaction type;
authenticating, by an identity system, an account employed on the client ES;
generating, by the PTFS, the subsequent provenance transaction of the transaction pair for the item-set responsive to authentication of the account employed on the client ES, wherein the subsequent provenance transaction includes a transaction identifier (ID) that identifies the subsequent provenance transaction, wherein the subsequent provenance transaction is a receive item transaction, a transformation transaction, a receive custody transaction or a receive service transaction;
storing, by the PTFS, the subsequent provenance transaction on a blockchain through a blockchain interface; and
reconciling, by the PTFS, a prior provenance transaction of the transaction pair in response to storing the subsequent provenance transaction, wherein the reconciling comprises:
attempting to identify the prior provenance transaction; and
updating the prior provenance transaction on the blockchain through the blockchain interface to include the transaction ID of the subsequent provenance transaction in response to identifying the prior provenance transaction.

12. The method of claim 10, further comprising:
storing, by the PTFS, ancillary data of the subsequent provenance transaction on a secure datastore through a datastore interface of the PTFS.

13. The method of claim 12, further comprising:
retrieving, by the PTFS, a document associated with the prior provenance transaction on the secure datastore through a document system.

14. The method of claim 10, wherein the reconciling further comprises inhibiting the updating of the prior provenance transaction responsive to the attempting to identify the prior provenance transaction failing to identify the prior provenance transaction in the blockchain.

15. The method of claim 14, wherein the prior provenance transaction is generated after the subsequent provenance transaction, and the inhibiting is removed responsive to generation of the prior provenance transaction.

16. The method of claim 11, wherein the attempting to identify the prior provenance transaction of the reconciling further comprises:
searching the blockchain for a set of unreconciled provenance transactions;
searching documents associated with the set of unreconciled provenance transactions for a document ID included in the prior provenance transaction request; and
selecting a given unreconciled provenance transaction of the set of unreconciled provenance transactions as the prior provenance transaction responsive to matching the document ID included in the subsequent provenance transaction request with a document associated with the given unreconciled provenance transaction.

17. The method of claim 16, wherein the document ID is a purchase order ID.

18. The method of claim 11, further comprising:
determining, by the PTFS, the provenance of the item-set by:
retrieving provenance transactions associated with the item from the blockchain via the blockchain interface, wherein the provenance transactions retrieved from the blockchain include the subsequent provenance transaction and the prior provenance transaction; and generating, by a search and provenance graph system of the PTFS, a representation characterizing the provenance transactions retrieved from the blockchain in time order.

19. The method of claim 11, wherein the client ES is a first client ES, and the PTFS receives a request provided through a second client ES for transactions of an item of the item-set, and responsive to the request, the PTFS:

determines, based on a company identifier included in the request, information related to the transaction of the item identified in the request;

suppresses, based on the company identifier included in the request, unauthorized information related to the transaction to form authorization information for the request; and communicates the authorized information to the second client ES.

20. The method of claim 11, wherein:

the prior provenance transaction request includes a digital signature of a first custodian indicating that the first custodian had custody of the item-set; and the subsequent provenance transaction request includes a digital signature of a second custodian and a timestamp indicating that the second custodian received the item-set from the first custodian at a time identified in the timestamp.

* * * * *